United States Patent [19]

Robertson

[11] Patent Number: 5,448,615
[45] Date of Patent: Sep. 5, 1995

[54] FILM CASSETTE

[75] Inventor: Jeffrey C. Robertson, Rochester, N.Y.

[73] Assignee: Eastman Kodak Company, Rochester, N.Y.

[21] Appl. No.: 298,089

[22] Filed: Aug. 30, 1994

Related U.S. Application Data

[63] Continuation-in-part of Ser. No. 86,019, Jun. 30, 1993, abandoned.

[51] Int. Cl.6 ............................................. G03B 17/26
[52] U.S. Cl. ................................... 378/182; 378/165; 378/187
[58] Field of Search ............... 378/182, 185, 187, 188, 378/165, 166

[56] References Cited

U.S. PATENT DOCUMENTS

| | | | |
|---|---|---|---|
| 3,630,172 | 12/1971 | Neu | 116/114 |
| 3,703,272 | 11/1972 | Lareau | 250/67 |
| 3,962,585 | 6/1976 | Huettner et al. | 250/476 |
| 4,104,528 | 8/1978 | Strax | 378/180 X |
| 4,112,304 | 9/1978 | Huettner et al. | 250/476 |
| 4,259,586 | 3/1981 | Schmidt et al. | 378/187 |
| 4,313,538 | 2/1982 | Bauer et al. | 206/455 |
| 4,653,888 | 3/1987 | Komamura et al. | 354/276 |
| 4,712,228 | 12/1987 | Johnson et al. | 378/185 |
| 4,744,100 | 5/1988 | Bauer et al. | 378/187 |
| 4,807,271 | 2/1989 | Covington et al. | 378/182 |
| 4,972,450 | 11/1990 | Carlile et al. | 378/166 |

FOREIGN PATENT DOCUMENTS

| | | |
|---|---|---|
| 0008756 | 3/1980 | European Pat. Off. . |
| 825947 | 12/1951 | Germany . |
| 2327385 | 12/1974 | Germany .......................... 378/166 |
| 2714704 | 5/1978 | Germany .......................... 378/166 |
| 2812929 | 10/1979 | Germany . |
| 89/04997 | 6/1989 | WIPO . |

OTHER PUBLICATIONS

Patent Abstracts of Japan, vol. 15, No. 20 (p.–1154), Jan. 17, 1991.

Primary Examiner—David P. Porta
Attorney, Agent, or Firm—Robert L. Walker

[57] ABSTRACT

An x-ray film cassette having a base and a cover adapted to close upon the base. The cover is provided with an identification window. A pressure plate is secured within the cassette. The cover, pressure plate and base form a light-tight space for receiving a sheet of x-ray film. The pressure plate is also provided with an identification window which is in substantial alignment with the identification window of the cover. A light-tight slideable window shutter is provided for covering of the identification window of the cover and/or the pressure plate. The slideable window shutter, when in a first position, provides a light-tight seal against the windows and when in a second position allows information to be provided to an x-ray film contained within the cassette. An indicator assembly is secured to the pressure plate and is at least partially visible through the cover for indicating when film is present within the cassette and for indicating when the window shutter has been opened.

36 Claims, 20 Drawing Sheets

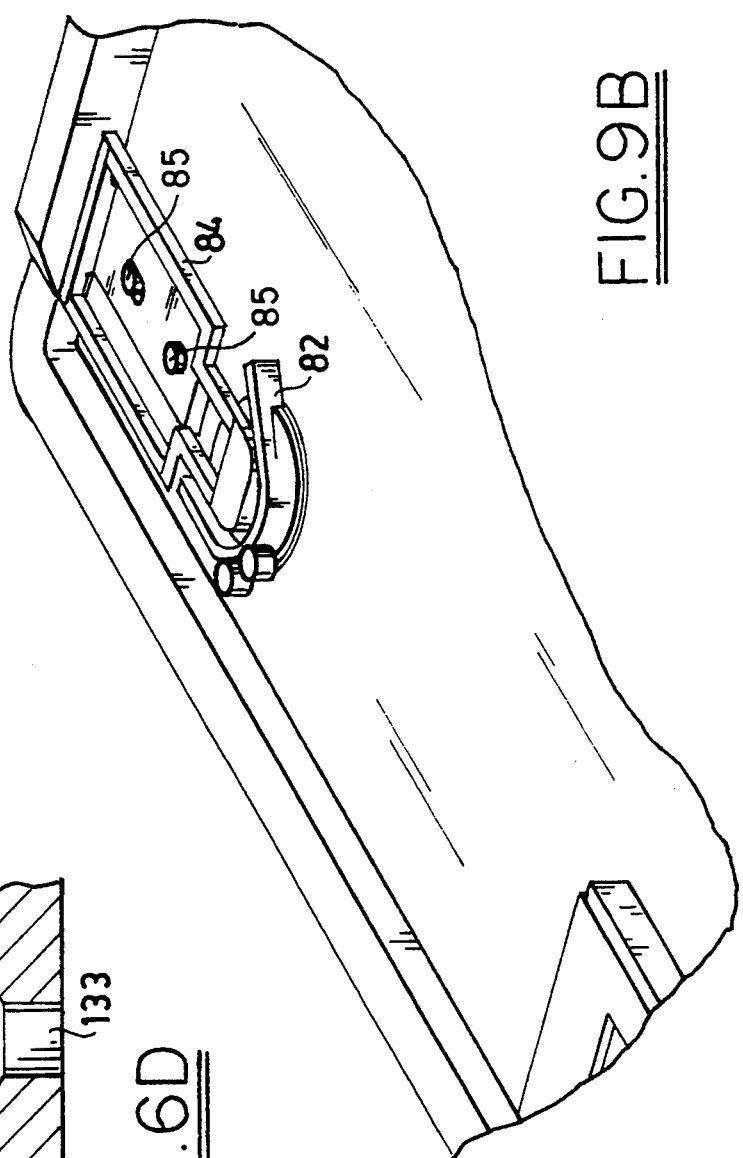
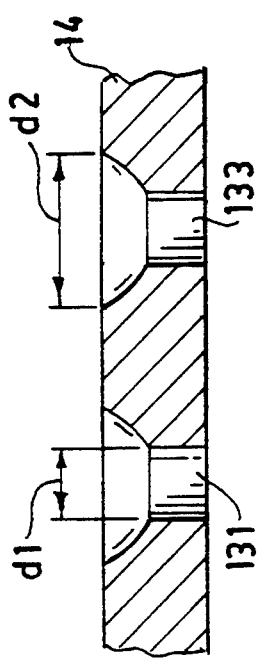
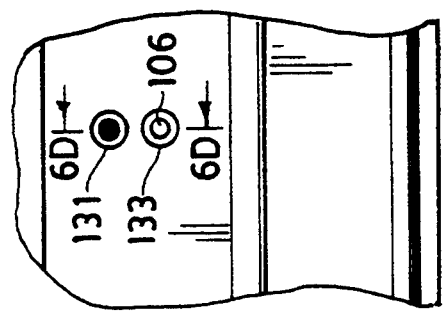

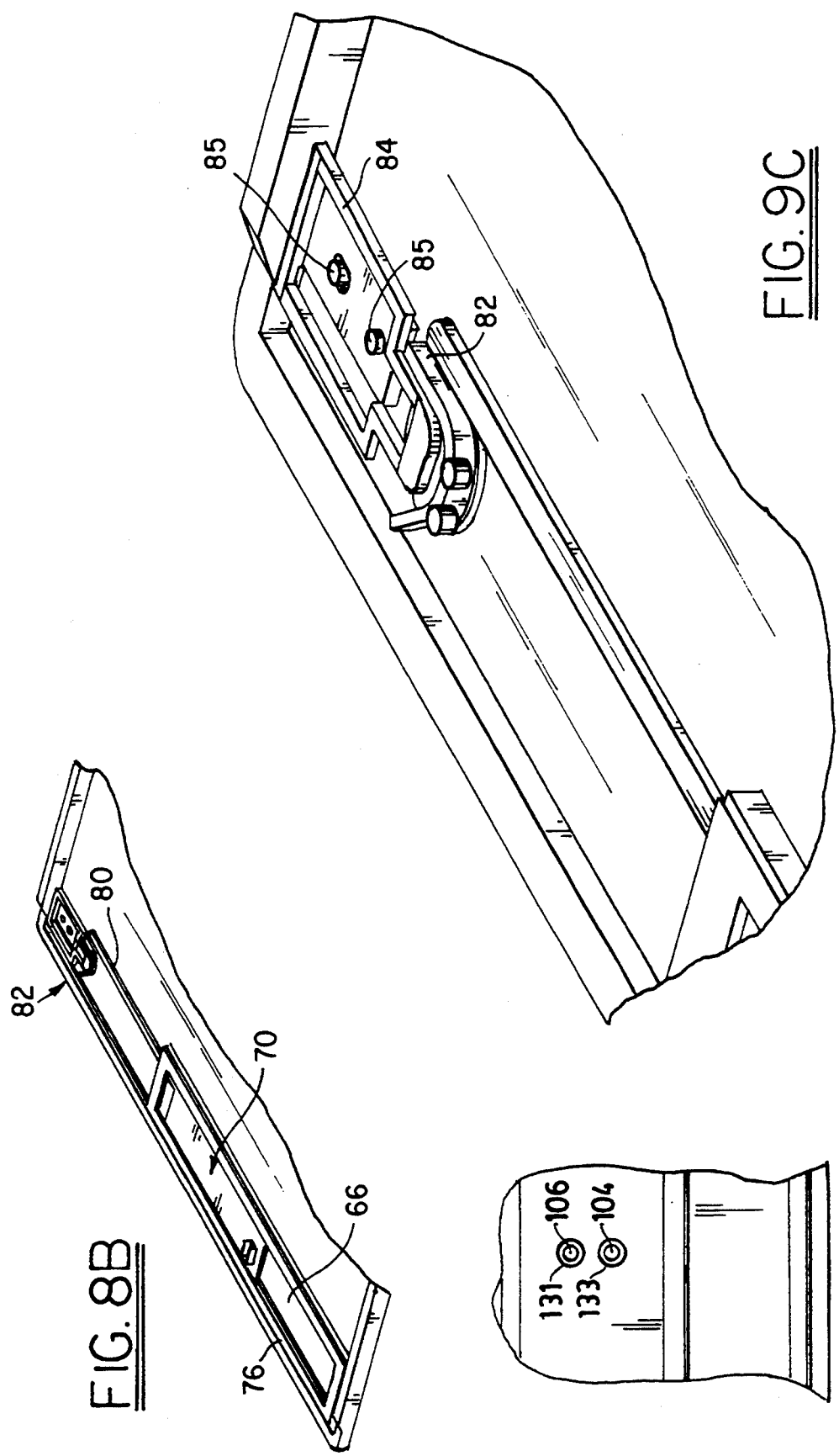

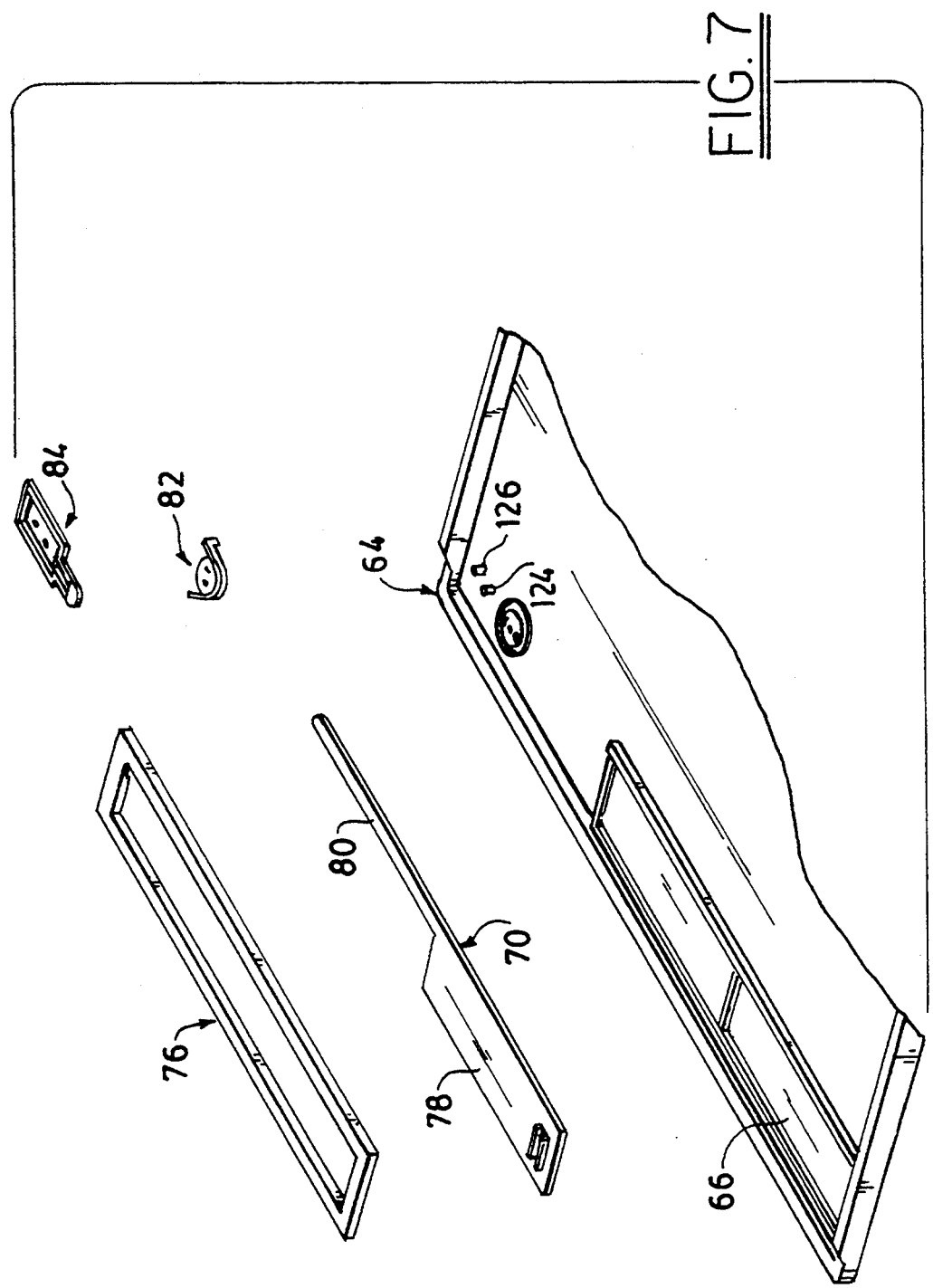

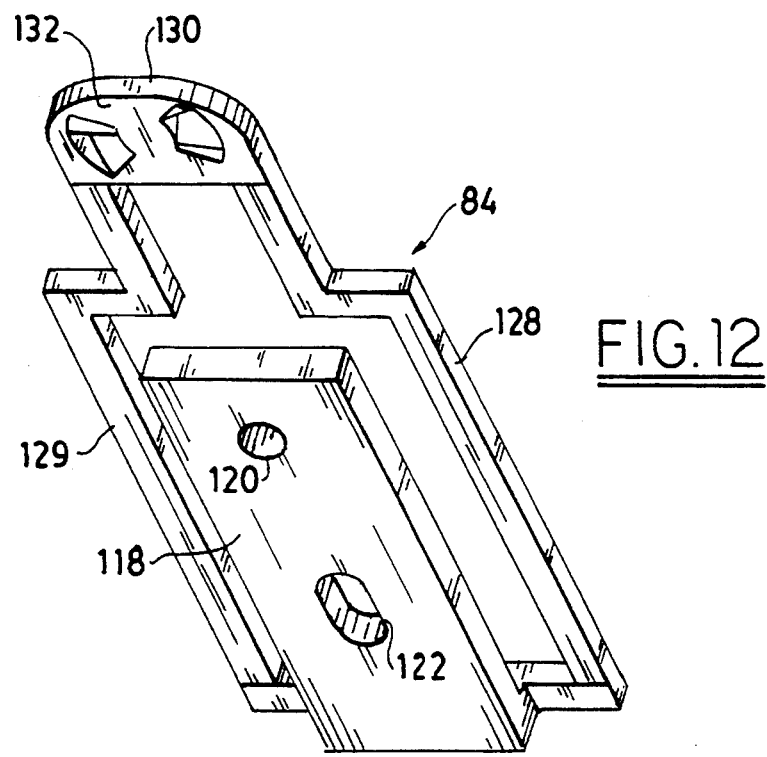
FIG. 12
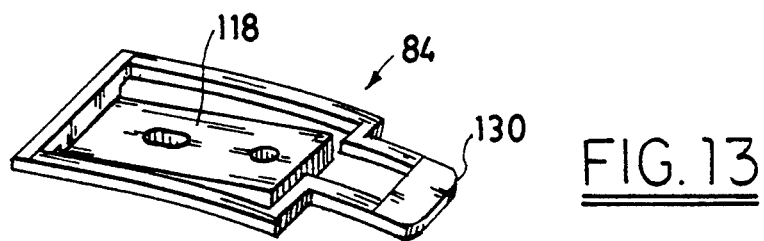
FIG. 13
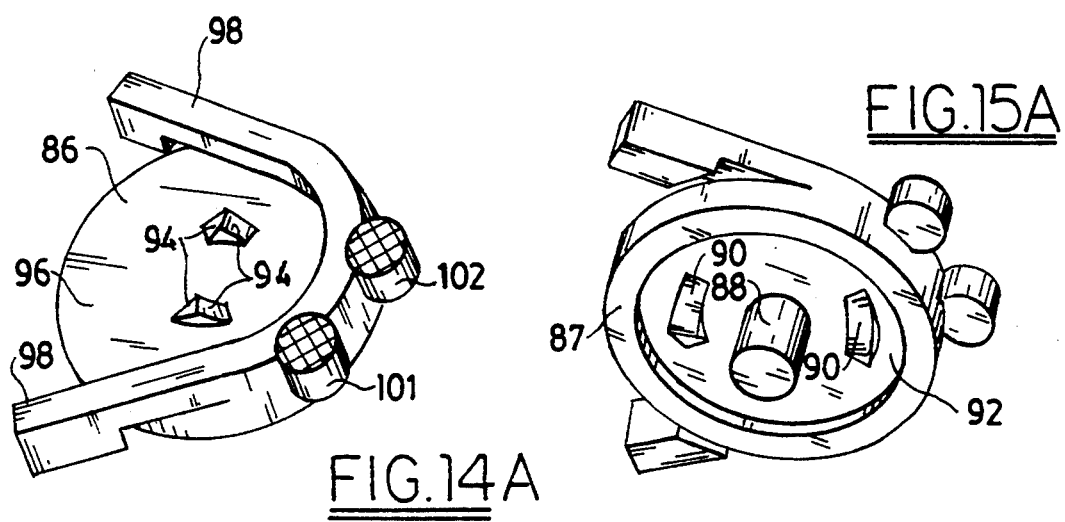
FIG. 14A
FIG. 15A

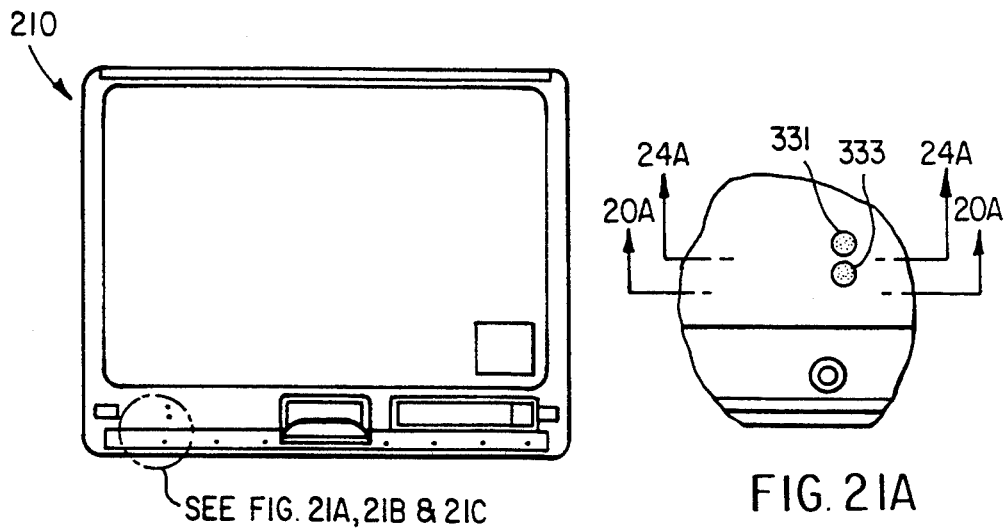
FIG. 19
FIG. 21A
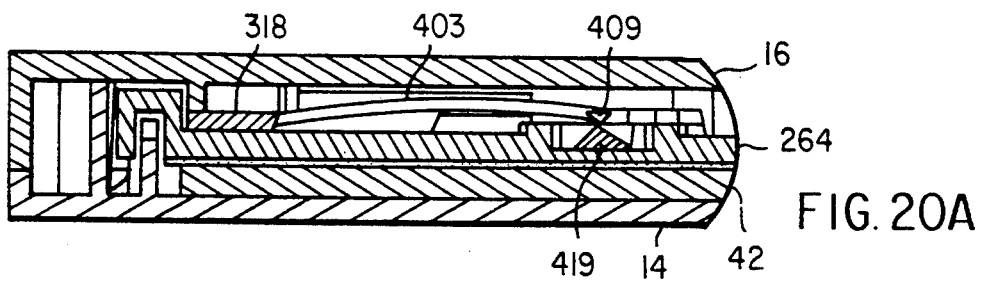
FIG. 20A
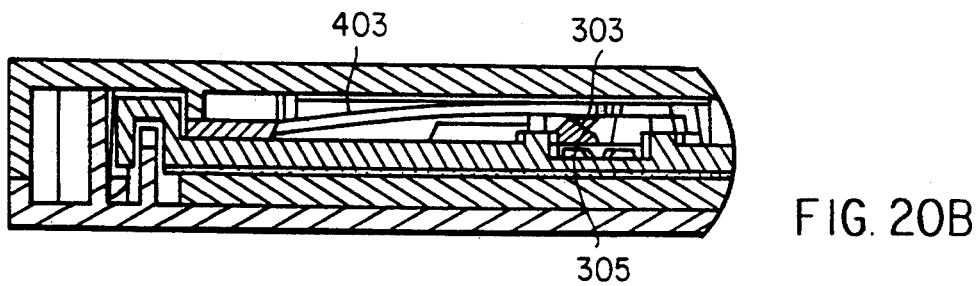
FIG. 20B
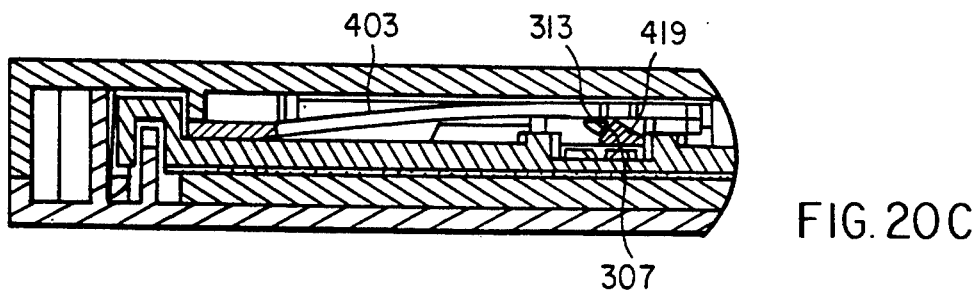
FIG. 20C

FILM CASSETTE

This is a Continuation-In-Part of application Ser. No. 08/086,019, filed 30 Jun. 1993, now abandoned.

FIELD OF THE INVENTION

The present invention relates to cassettes for holding photosensitive material. Still, more particularly, the present invention relates to a cassette for holding x-ray film.

BACKGROUND OF THE INVENTION

In the prior art it has been difficult, especially in connection with x-ray cassettes, to ascertain whether or not the cassette contains film without opening of the cassette. As a result of this inability, mistakes have often been made and either an empty cassette was used during an x-ray exposure, or a cassette was used more than once. In each instance, the intended x-ray had to be retaken, which is not only very wasteful with respect to time, but also exposes the patient to unnecessary amounts of radiation.

The prior art has suggested the use of an indicator for identifying if the cassette contains an x-ray film. For example, U.S. Pat. No. 4,248,172 and German Patent 825,947 disclose a small moveable button which is slideable between a first position wherein the button is flush with the exterior surface of the cassette, and a second position wherein the button was recessed from the exterior surface. If film is present, the button is prevented from falling into the second position and thus indicating the presence of film.

Another common feature in x-ray cassettes is the patient identification window. Typically, this feature consists of an opening through the cassette which is covered by a light-tight slideable shutter. In use, the cassette is placed in the patient identification camera which establishes a light-tight seal against the cassette surrounding the window; opens the shutter; optically transfers patient identification information onto the x-ray film contained within the cassette; closes the shutter; and retracts the sealing means.

It is also common in places where radiography is practiced in large volumes, such as in large hospitals, to provide machines which automate the unloading and reloading of x-ray cassettes. Typically, these machines are comprised of a light-tight chamber into which the x-ray cassette is passed or placed. The chamber contains a first mechanism to open the cassette and a second mechanism generally featuring a plurality of suction cups to pick up the film and remove it from the cassette. Such mechanisms often fail when the film, which has been pressed into intimate contact with the intensifying screen, sticks to the upper screen when the cassette is open and thus is not in the proper position to be picked up by the suction cup mechanism.

Intensifying screens are often used in cassettes in order to increase exposure of the x-ray film. However, there is often some loss in sharpness of the image that is formed. This loss in sharpness is related to the separation distance between the light-sensitive layers of the film, and the light-emitting layers of the intensifying screen. To minimize this loss in sharpness, intensifying screens are often held in intimate contact with the film. In typical x-ray prior art cassettes, this intimate contact is normally accomplished by mounting the screens on resilient foam pads which are adhered to the cassette when closed.

Applicant has invented an improved film presence indicator which will indicate the presence of film in the cassette regardless of the cassette orientation and will, in addition, indicate whether a patient identification window of the cassette has been actuated. Further, when a cassette is open for removal of the film, the film presence indicator will push the film away from the upper screen assuring that the film is in the proper location for extraction by automatic cassette loaders.

SUMMARY OF THE INVENTION

An x-ray film cassette having a base and a cover adapted to close upon the base. The cover is provided with an identification window. A pressure plate is secured within the cassette. The cover, pressure plate and base form a light-tight space for receiving a sheet of x-ray film. The pressure plate is also provided with an identification window which is in substantial alignment with the identification window of the cover. A light-tight slideable window shutter is provided for covering of the identification window of the cover and/or the pressure plate. The slideable window shutter, when in a first position, provides a light-tight seal against the window, and when in a second position, allows information to be provided to an x-ray film contained within the cassette. An indicator assembly is secured to the pressure plate and is at least partially visible through the cover for indicating when film is present within the cassette and for indicating when the window shutter has been opened.

DESCRIPTION OF THE DRAWINGS

FIG. 6B is a view similar to FIG. 6A, except it illustrates the film identification openings as they would appear when the film presence indicator is in the position illustrated by FIG. 5B;

FIG. 6C is a view similar to FIG. 6A illustrating the identification openings as they would appear when the film presence indicator is in the position illustrated by FIG. 5C;

FIG. 6D is a cross-sectional view of the cover as taken along line 6D—6D of FIG. 6B illustrating the indicating openings;

FIG. 7 is a partial exploded view of the pressure plate assembly;

FIG. 8B is a view similar to FIG. 8A except illustrating the shutter in the open position;

FIG. 9B is a view similar to FIG. 9A illustrating the film presence indicator in the position illustrated in FIG. 5B;

FIG. 9C is a view similar to FIG. 9A illustrating the film presence indicator in the position illustrated in FIG. 5C;

FIG. 12 is an enlarged bottom perspective view of the spring of the film presence indicator assembly;

FIG. 13 is a top perspective view of the spring of FIG. 12;

FIG. 14A is a top perspective view of the film presence indicator;

FIG. 15A is a bottom perspective view of the film presence indicator;

FIG. 19 is a top plan view of an alternative embodiment of the cassette of the present invention;

FIG. 20A is a partial cross-sectional view of the cassette of FIG. 19, taken substantially along line F20A—F20A of FIG. 21A, illustrating the film presence indicator of the cassette in a first predetermined position; FIG. 20B is a view similar to FIG. 20A, taken substantially along line F20B—F20B of FIG. 21B, illustrating the film presence indicator in a second predetermined position;

FIG. 20C is a view similar to FIG. 20A, taken substantially along line F20C—F20C of FIG. 21C, illustrating the film presence indicator in a third predetermined position;

FIGS. 21A, 21B, and 21C are a partial top plan views of the cassette as outlined by line F21—F21 in FIG. 19, illustrating the identification openings used to make visible the position of the film presence indicator when the film presence indicator is in the positions shown in FIGS. 20A, 20B, and 20C, respectively;

DETAILED DESCRIPTION

Figure 1:
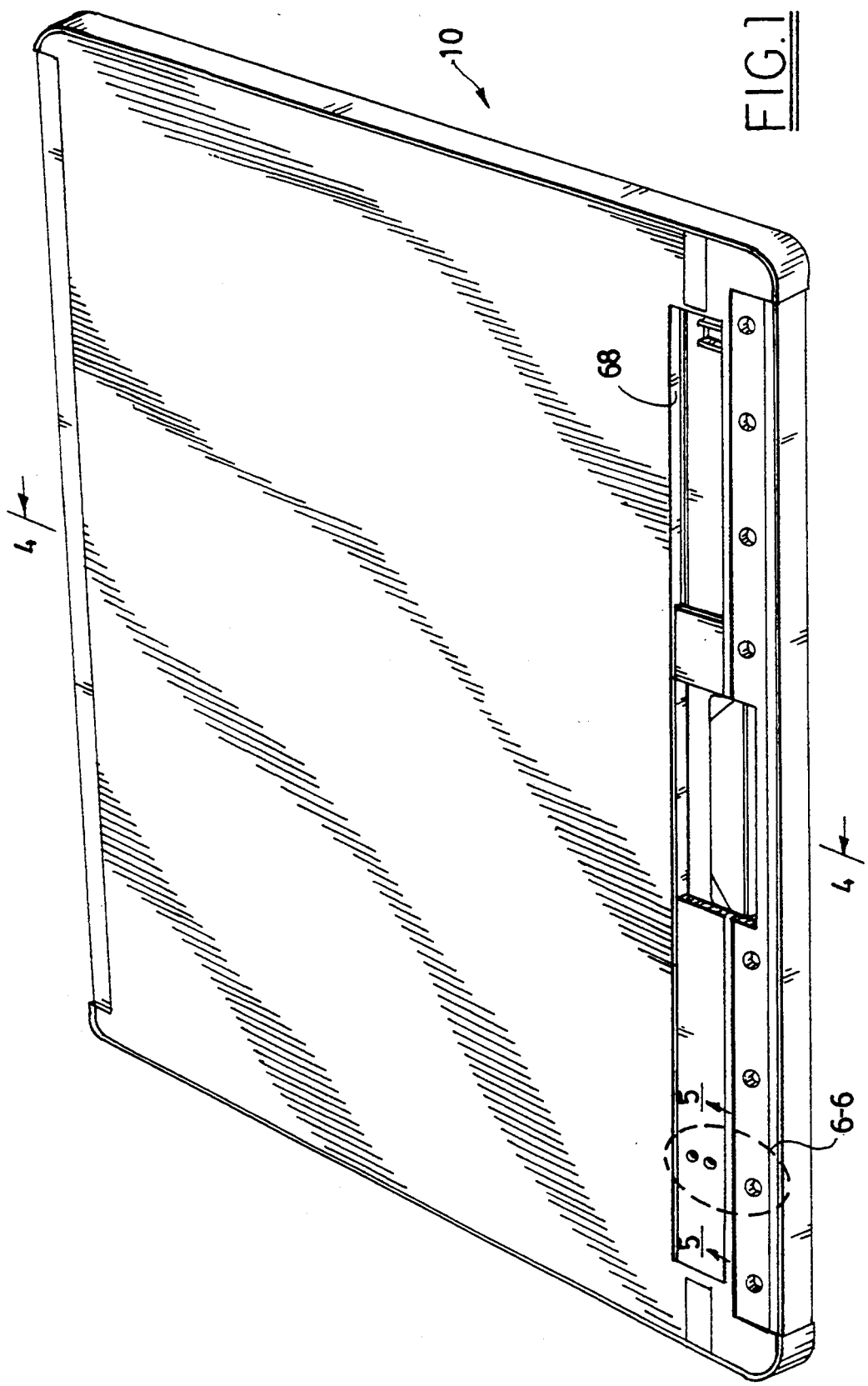
FIG. 1 is a perspective view of a cassette made in accordance with the present invention.
Figure 2:
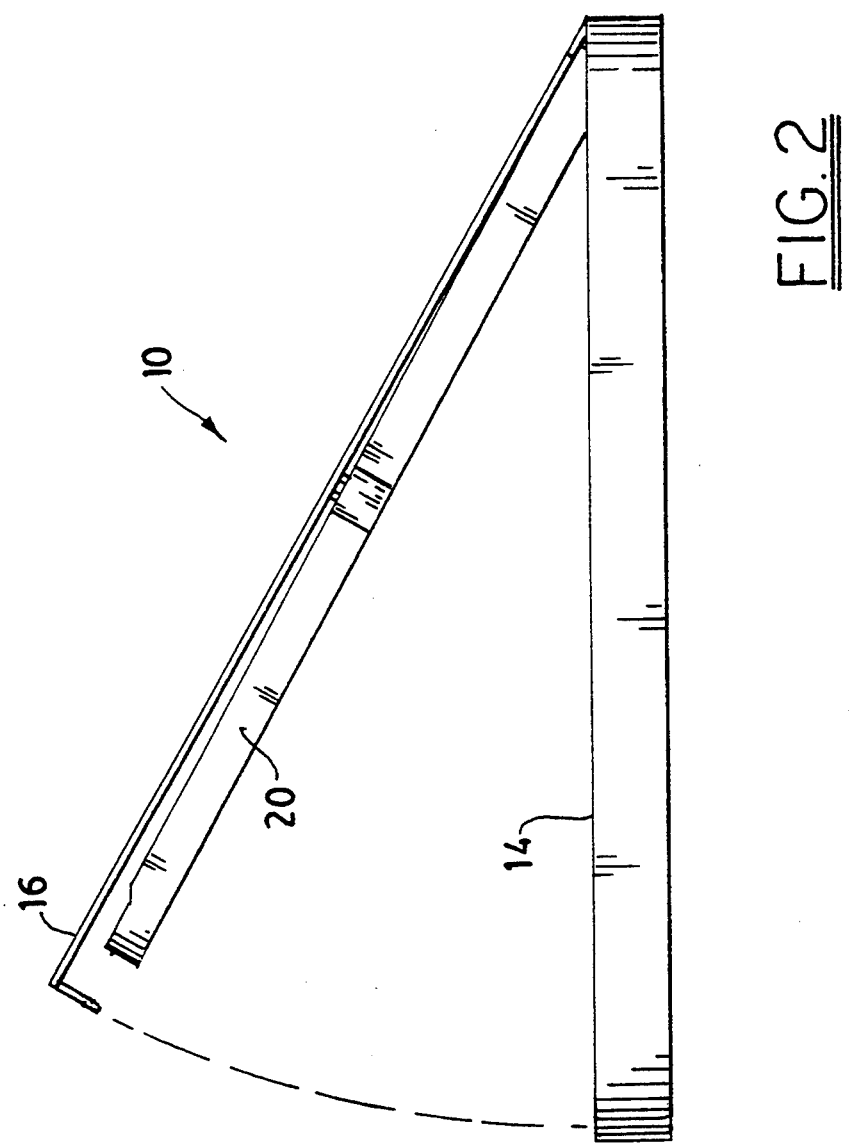
FIG. 2 is a side elevational view of the cassette of FIG. 1 showing the cassette in the open position.
Figure 3:
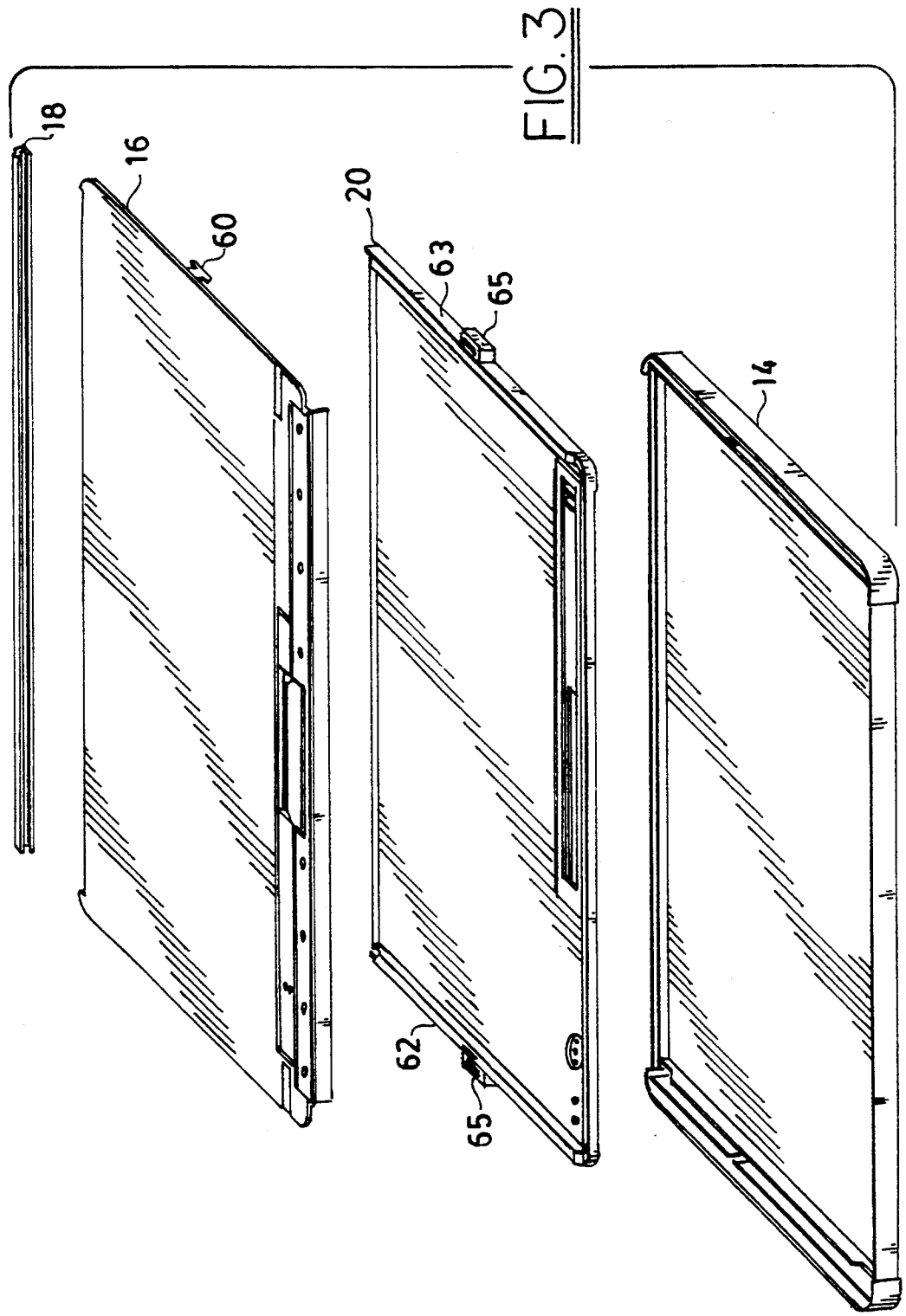
FIG. 3 is a exploded perspective view of the cassette of FIG. 1.
Figure 4:
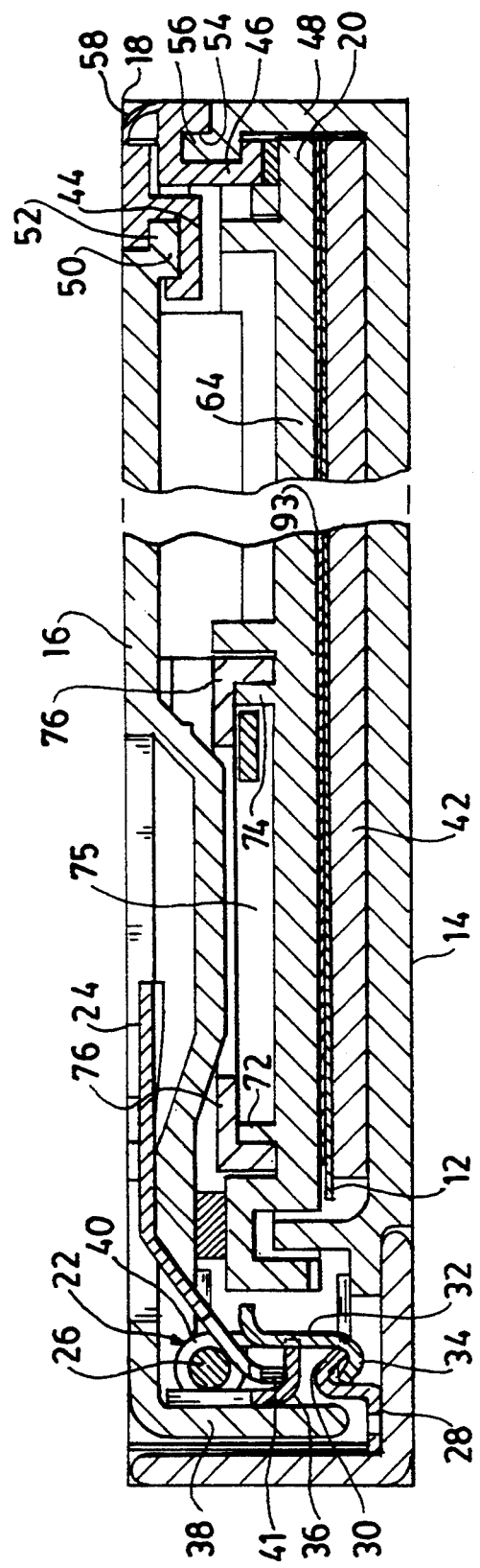
FIG. 4 is a cross-sectional view of the cassette of FIG. 1 as taken along line 4—4.

Referring to the drawings, there is illustrated a cassette 10 made in accordance with the present invention. In particular, referring to FIGS. 1-4, there is illustrated a cassette 10 which is adapted to receive a sheet of x-ray film 12. In the particular embodiment illustrated, the cassette 10 is designed to receive an x-ray film for use in mammography. Cassette 10 comprises a base 14 and a cover 16 secured to the base by a hinge 18 so that the cover 16 may be rotated between an open and closed position. A pressure plate assembly 20 is secured to the cover 16. The cover 16, pressure plate assembly 20 and base 14 form a light-tight space for receiving a sheet of x-ray film 12. A latch assembly 22 is provided for securing the cover 16 in closed relationship with base 14. In the particular embodiment illustrated, the latch assembly 22 includes a latch lever 24 which is rotatably mounted to cover 16 through the use of a pin 26 secured to cover 16 about which the lever 24 rotates. A retaining member 28 is secured to the base 14 and has a hook portion 30. A pawl member 32 is rotatably mounted to pin 26 and has a lower latch portion 34 for engagement with the hook portion 30 so as to maintain the cover in the closed position with the base 14. A projecting member 36 is secured to the outer rim 38 of the cover 16 for limiting the movement of the pawl member 32 toward the outer rim 38 of the cover. A spring 40 biases the pawl member 32 toward the outer rim 38 so as to maintain the latch portion 34 in engagement with the hook portion 30. When the lever 24 is rotated outward from the position illustrated in FIG. 4, the lower end 41 will cause disengagement of the pawl member 32 so that the cover 16 may be moved to the open position as illustrated in FIG. 2. In order to close the cover 16 onto the base 14, the cover 16 is simply moved toward the base 14 until the latch portion 34 engages the hook member 30. It is to be understood that various other latch mechanisms may be used for latching and unlatching the cover 16 with respect to base 14.

A foam pad 42 is secured to the base 14 as is typically done in prior art cassettes. The foam pad 42 is made out of a material typically used for such purposes. In the particular embodiment illustrated, foam pad 42 is made of an open cell polyurethane and is secured to base 14 by an appropriate adhesive.

The hinge 18 includes a first portion 44 which is secured to the cover 16 and a second portion 46 which is secured to the peripheral rear wall 48 of base 14. In the particular embodiment illustrated, the first portion 44 has a generally J-shaped configuration forming a recess 50 for receiving a mating projection 52 on cover 16. In a like manner, the second portion 46 comprises a generally C-shaped configuration forming a recess 54 which receives a mating projection 56 formed in the peripheral rear wall 48. A connecting portion 58 connects the first and second portions 44,46. In the preferred embodiment illustrated, the hinge 18 is integrally formed of a single material so as to provide what is commonly known as a living hinge. In the particular embodiment illustrated, the hinge is made out of polypropylene material. It is, however, to be understood that the hinge 18 may be formed in any other manner and constructed in any desired construction.

Referring to FIGS. 4–18, there is illustrated in more detail the construction of pressure plate assembly 20. In particular, pressure plate assembly 20 includes a pressure plate 64 having a substantially rectangular opening 66 which is in substantial alignment with a substantially rectangular identification opening 68 provided in cover 16 (see FIG. 1). In the preferred embodiment illustrated, the openings 66,68 each have substantially the same size and configuration. Openings 66,68 allow information, for example, patient identification information, to be exposed on the film as is customarily done in the art. A slideable shutter 70 is secured to pressure plate 64 for opening and closing the opening 66. Alternatively, the shutter 70 may close the opening 68 in cover 16 and/or both openings 66,68. Referring now particularly to FIGS. 4, 7, 8A, and 8B; in the particular embodiment illustrated, upstanding projections 72,74 are provided so as to define a track (recess) 75 for allowing the shutter 70 to slide within. In the particular embodiment illustrated, the upstanding projections 72,74 have a substantially rectangular cross-sectional configuration and are spaced apart in size so as to allow the shutter 70 to slide in a predetermined direction. A capture member 76 is provided and secured to projections 72,74 such that the shutter 70 will be captured therein. In the particular embodiment illustrated, the shutter 70 has a main section 78 designed to cover opening 66 so as to prevent undesirable light from entering the cassette when the shutter is in the closed position, and an actuating member 80 which is designed to engage a film presence indicator 82.

The pressure plate assembly 20 is secured to the cover by a pair of projections 60 (see FIG. 3) secured to lateral sides 62,63 of pressure plate assembly 20. The projections 60 each pass through a retaining opening 65 provided on the sides of the pressure plate 64.

The pressure plate assembly further includes a film presence indicator assembly for indicating when film is present in the cassette and if the shutter 70 has been activated to allow exposure of the film. The film presence indicator assembly includes an indicator or indicator member 82 and a spring or spring member 84.

Figure 10:
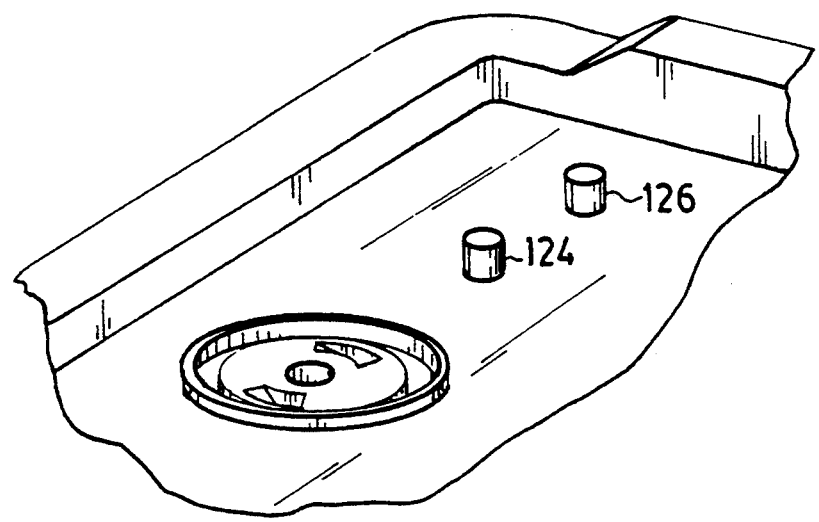
FIG. 10 is an enlarged perspective view of a portion of the pressure plate illustrating where the film presence indicator would be mounted with the spring and film presence indicator removed.

Indicator 82 is rotatably mounted about a predetermined axis to pressure plate 64. In particular, the film presence indicator 82 is rotatably held in position by a spring member 84 which is secured to the pressure plate 64 by pins 124,126 (FIG. 10).

A simulable phosphor screen/layer 93 is secured to the bottom surface 92 of pressure plate 64. The screen 93 is of any conventional type phosphor screen presently used in the art. In the particular embodiment illustrated, the screen 93 is adhered to the pressure plate 64 by an appropriate adhesive as is typically done in the prior art.

Figure 6A:
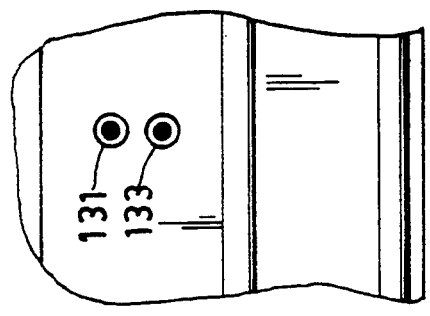
FIG. 6A is a partial top plan view of the cassette as outlined by line 6—6 illustrating the identification openings used to determine the position of the film presence indicator when the film presence indicator is in the position shown in FIG. 5A.

Referring to FIGS. 14A, 14B, 14C, 15A, 15B and 15C, there is illustrated in greater detail the film presence indicator 82. In particular, the film presence indicator 82 has a central circular platform 86 which supports a peripheral wall 87, a central shaft 88 and a pair of lower cams 90 on its lower surface 92. A pair of upper cams 94 are formed on the upper surface 96 of platform 86. Upper cams 94 together define an indicator engagement surface. A pair of wings 98 are provided for use in rotating the platform 86 as will be discussed in detail later herein. A pair of bosses 101,102 are secured to the forward end of the film presence indicator 82. Bosses 101,102, in the preferred embodiment illustrated, are substantially circular in shape and are spaced about the circumference of the platform 86 a predetermined distance D. In the embodiment illustrated, the bosses 101,102 each have a diameter of about 2.5 mm. The bosses 101,102 each have an upper surface 104,106, respectively, which, in the preferred embodiment, are decorated with a light color. In the particular embodiment illustrated, the upper surfaces 104,106 are colored with a white colored paint. The bosses 101,102 are positioned on platform 86 so that one or both can be viewed through a register having the form of a pair of indicating openings 131,133 as best seen by reference to FIGS. 6A, 6B, 6C and 6D. The openings provided in cover 14 are sized so as to be equal to or less than the size of bosses 101,102. In the embodiment illustrated, the openings 131,133 are circular in shape and have a diameter d1 of about 1.5 mm. Preferably, as illustrated in FIG. 6D, the area surrounding openings 131,133 in cover 14 is recessed so as to enhance the visibility of the bosses 101,102. In the embodiment illustrated, the area surrounding openings 131,133 is substantially dish-shaped and has a diameter d2 of about 3.0 mm.

The lower cams 90 are spaced an equal distance from the axis 108 of the substantially circular platform and central shaft 88. In particular, the lower cams 90 are spaced a distance R1. Each of the lower cams 90 have a pair of faces 91 which merge at a peak 112. Each of the lower cams 90 extend about the circumference an angle $\alpha$ and have a predetermined height H1. Angle $\alpha$ is preferably equal to or less than about 45°. In the particular embodiment illustrated, $\alpha$ is about 30°. Also, in the embodiment illustrated, the height H1 is 1.5 mm (0.060 inches).

The upper cams 94 are disposed a distance R2 from the rotational axis 108 which is less than the distance R1. Additionally, the upper cams 94 extend a circumferential distance about the platform an angle γ. Preferably, angle γ is equal to or less than about 45°. In the particular embodiment illustrated, the angle γ is approximately 25°. In the preferred embodiment illustrated, the angle γ is less than the angle α. Additionally, the upper cams 94 have a pair of upper cam surfaces 114 which terminate at a peak 116, the peak 116 having a height H2 with respect to the surface 96. The height H2 of upper cams 94 is preferably less than the height H1 of lower cams 90. As would be discussed later, the providing of the lower cams 90 at a greater distance R1 than the radius R2 of upper cams 94 and providing the lower cams 90 with a height greater than the height of the upper cams 94 provides a mechanical advantage for predisposing the film presence indicator 82 in a predetermined orientation.

Referring to FIGS. 12 and 13, there is illustrated a spring member 84 which secures the film presence indicator 82 to the pressure plate 64 while still allowing the indicator to rotate about axis 108. In particular, the spring member 84 includes a mounting base 118 which is used to mount the spring member 84 to the pressure plate 64. In particular, there is provided a pair of openings 120,122 which are designed to receive upstanding projections 124,126 formed on the upper surface of pressure plate 64. The upstanding projections 124,126 are aligned such that they are received in corresponding respective openings 120,122. In the particular embodiment illustrated, opening 120 is substantially circular, while opening 122 is substantially oval so as to accommodate for alignment errors that may occur between the openings 120,122 and projections 124,126. In the preferred embodiment illustrated, the projections 124,126 are made of a plastic material which is ultrasonically headed so as to secure the spring member 84 to the pressure plate 64. It is to be understood that the mounting base 118 may be secured to the pressure plate 64 in any desired manner. The spring member 84 includes a pair of side arm members 128,129 which have, at one end, been secured to the base member 118 and the other end being secured to a head portion 130. As illustrated in FIG. 13, the side arm members 128,129 have a configuration such that the head portion, in its natural state, is below the mounting base 118. Thus, when the spring member 84 is secured to pressure plate 64, a biasing force will be applied in the direction of pressure plate 64. In the preferred embodiment illustrated, the spring member 84 is a single unitary member molded from an appropriate plastic material. In the particular embodiment illustrated, the spring member 84 is made out of a polycarbonate plastic material. The spring head or head portion 130 has a bottom surface 132. The head portion 130 is provided with a first pair of pockets 134,135 which are disposed approximately 180° apart and equal distance from the axis 136. The associated pair of pockets 134,135 together define a first spring engagement surface that is designed to receive indicator engagement surface. The pockets 134,135 have a substantially V-shaped cross-sectional configuration and are designed to mate with the corresponding cams 94 such that the film presence indicator will be held in a first predetermined orientation as represented by axis y—y. A second pair of pockets 138,139 are provided adjacent pockets pockets 134,135. The second pair of pockets 138,139 together define a second spring engagement surface that is also designed to receive indicator engagement surface. The pockets 138,139 have a substantially V-shaped cross-sectional configuration and are designed to mate with the corresponding cams 94 such that the film presence indicator will be held in a second predetermined orientation represented by axis z—z. The pockets 134,135,138,139 are also disposed about the axis 136 a radius R1. In the preferred embodiment illustrated, the pair of pockets 134,135 extend an angle γ1 about the axis 136. Preferably, the angle γ1 is substantially equal or greater than the angle γ of cams 94. Thus, when cams 94 are in this position, the cams 94 will fit substantially totally within the pockets 134,135. The pockets 138,139 extend an angle γ2 about axis 136 which is substantially less than angle γ1. In the particular embodiment illustrated, the angle γγ1 is equal to approximately 25° which is less than the angle γ through which the cams 94 extend.

Figure 11:
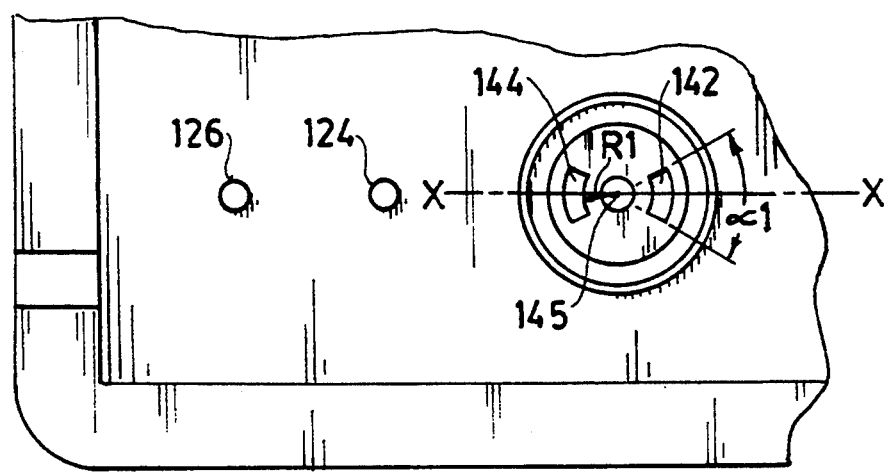
FIG. 11 is a top plan view of FIG. 10.
Figure 14B:
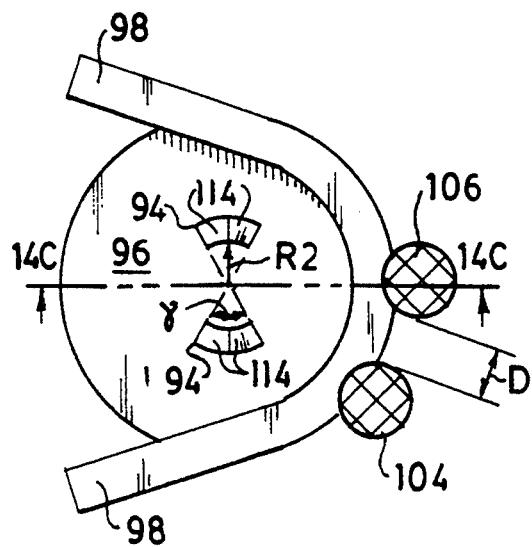
FIG. 14B is a top plan view of the film presence indicator of FIG. 14A.
Figure 14C:
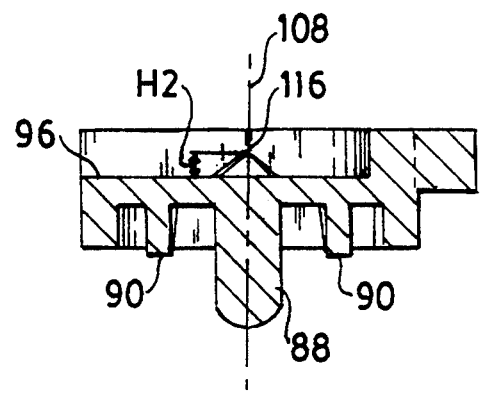
FIG. 14C is a cross-sectional view of the film presence indicator taken along line 14C—14C of FIG. 14B.
Figure 15B:
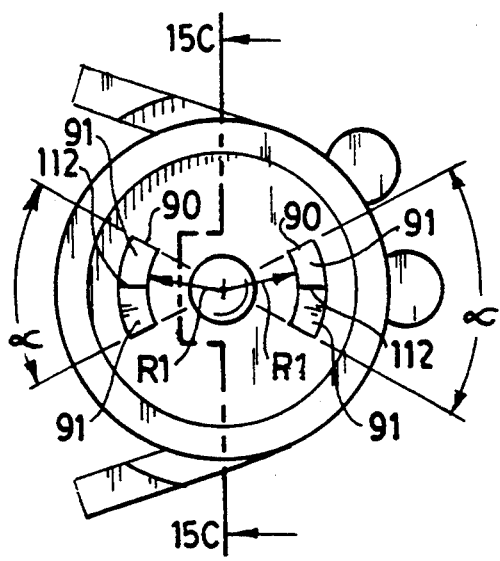
FIG. 15B is a bottom plan view of the indicator of FIG. 15A.
Figure 15C:
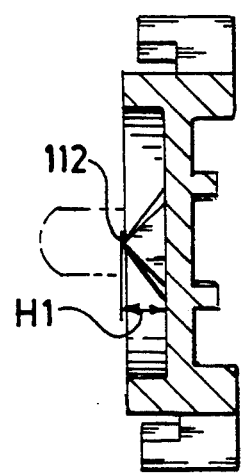
FIG. 15C is a cross-sectional view of the film presence indicator as taken along line 15C—15C of FIG. 15B.
Figures 16, 17, 18:
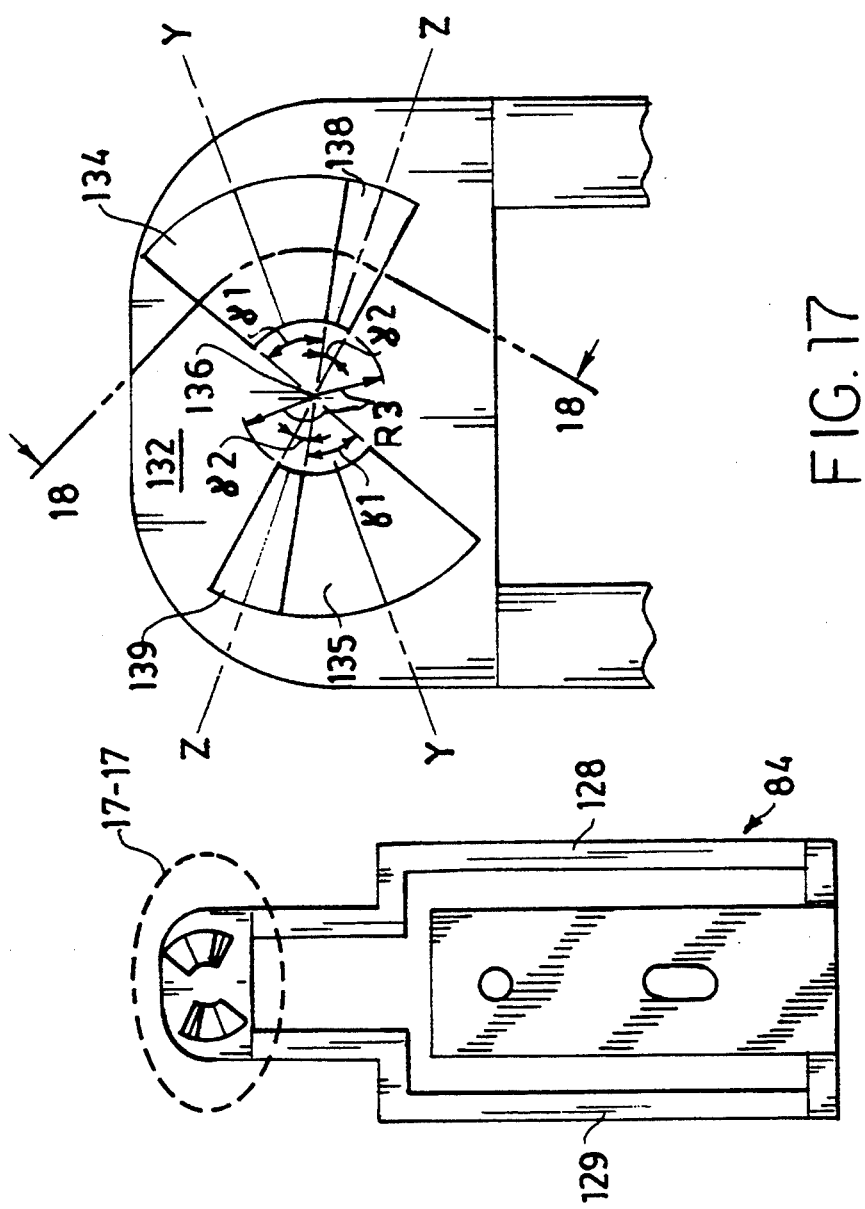
FIG. 16 is a bottom plan view of the spring of FIG. 12.
FIG. 17 is a greatly enlarged bottom plan view of the spring head of the spring of FIG. 16 as outlined by line 17—17.
FIG. 18 is a cross-sectional view as taken along line 18—18 of FIG. 17.
Figure 21B:
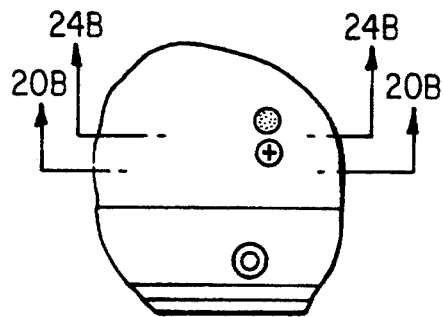
Figure 21C:
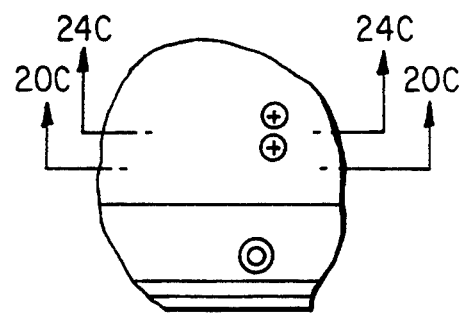
Figure 22:
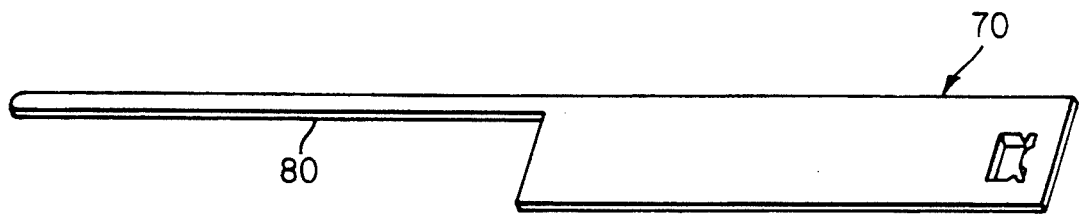
FIG. 22 is a perspective view of the shutter of the cassette of FIG. 19.
Figure 23A:
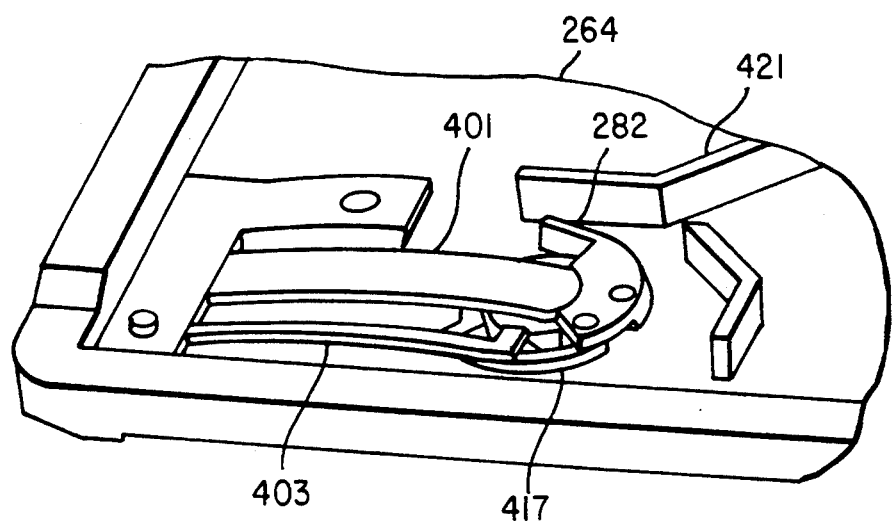
FIG. 23A is an enlarged partial perspective view of the indicator assembly and pressure plate of the cassette of FIG. 19, illustrating the film presence indicator in the position illustrated in FIG. 20A.
Figure 23B:
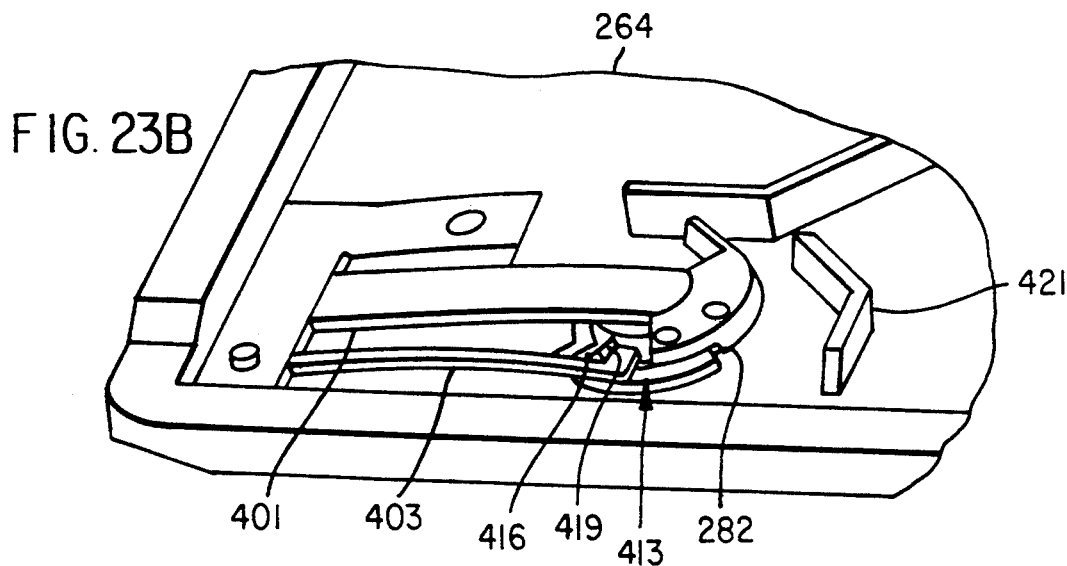
FIG. 23B is a view similar to FIG. 23A illustrating the film presence indicator in the position illustrated in FIG. 20B.
Figure 23C:
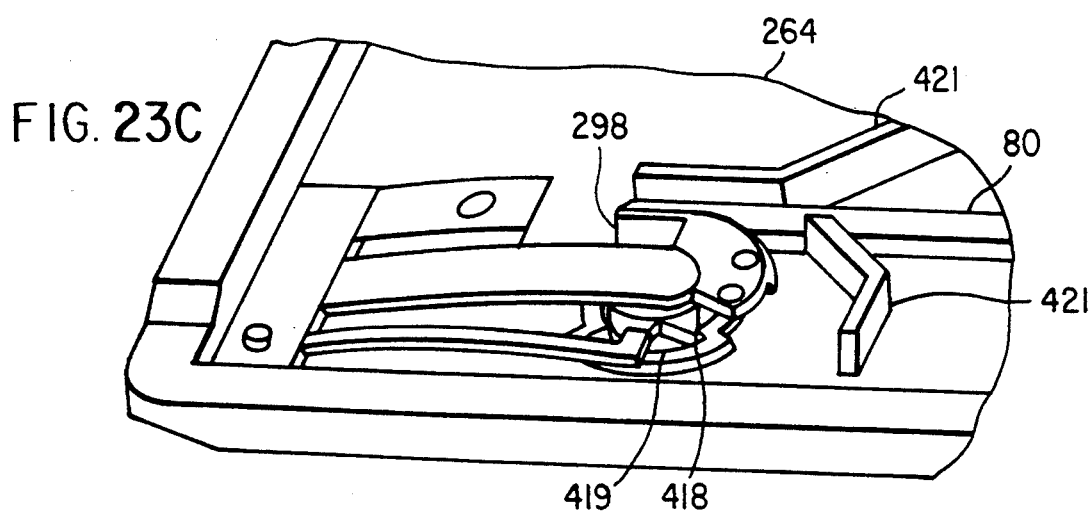
FIG. 23C is a view similar to FIG. 23A illustrating the position of the film presence indicator and actuator member of shutter when shutter is open.
Figure 23D:
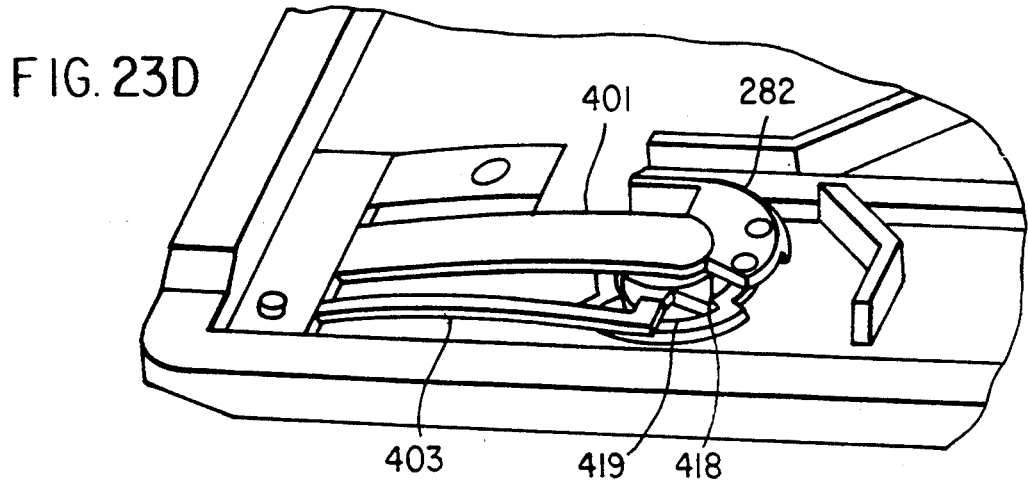
FIG. 23D is a view similar to FIG. 23A illustrating the position of the film presence indicator when shutter is reclosed.
Figure 24A:
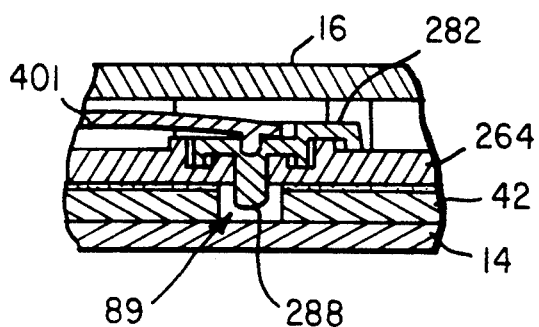
FIG. 24A is a partial cross-sectional view of the cassette of FIG. 19, taken substantially along line F24A—F24A of FIG. 21A, illustrating the film presence indicator of the cassette in he position shown in Figure 20A.
Figure 24B:
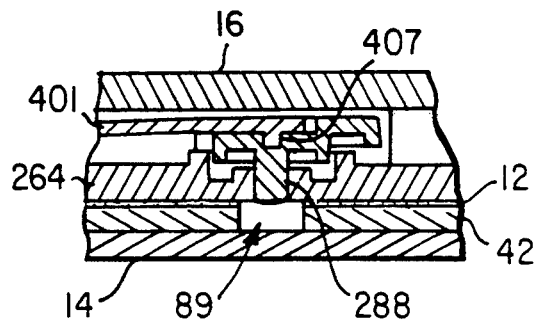
FIG. 24B is a view similar to FIG. 24A, taken substantially along line F24B—F24B of FIG. 21B, illustrating the film presence indicator in the position shown in FIG. 20B.
Figure 24C:
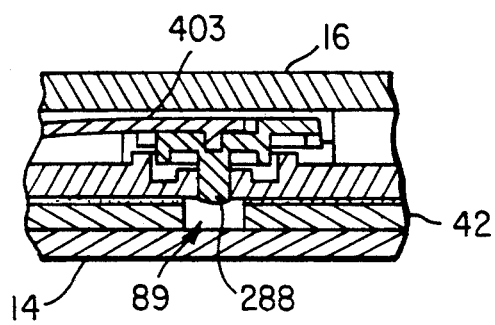
FIG. 24C is a view similar to FIG. 24A, taken substantially along line F24C—F24C of FIG. 21C, illustrating the film presence indicator in the position shown in FIG. 20C.
Figure 25:
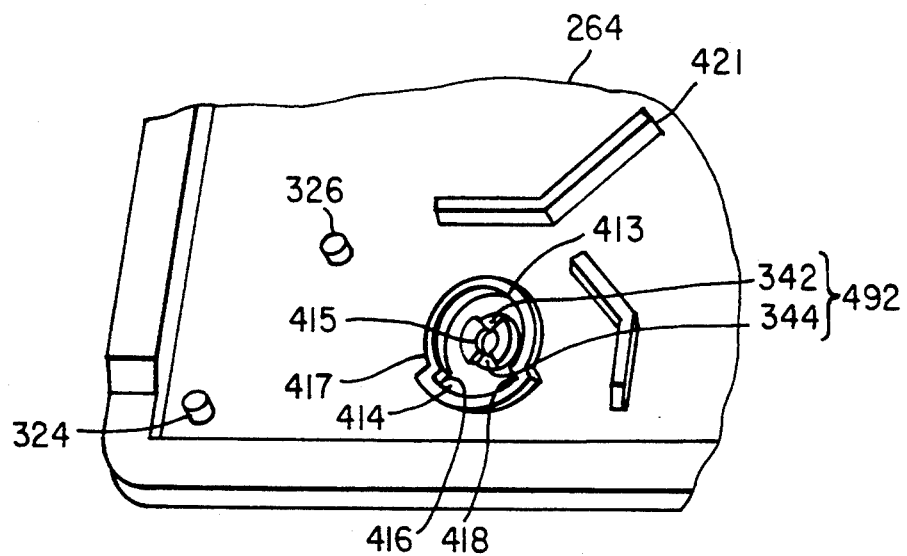
FIG. 25 is an enlarged perspective view of a portion of the pressure plate of the cassette of FIG. 19, illustrating where the film presence indicator would be mounted, with the spring and film presence indicator removed.
Figure 26A:
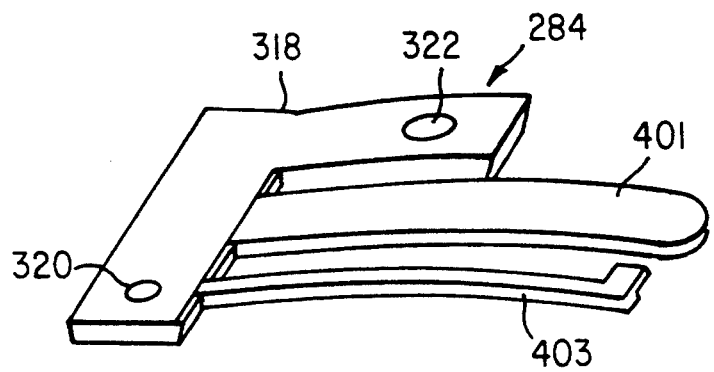
FIG. 26A is an enlarged top perspective view of the spring of the film presence indicator assembly of the cassette of FIG. 19.
Figure 26B:
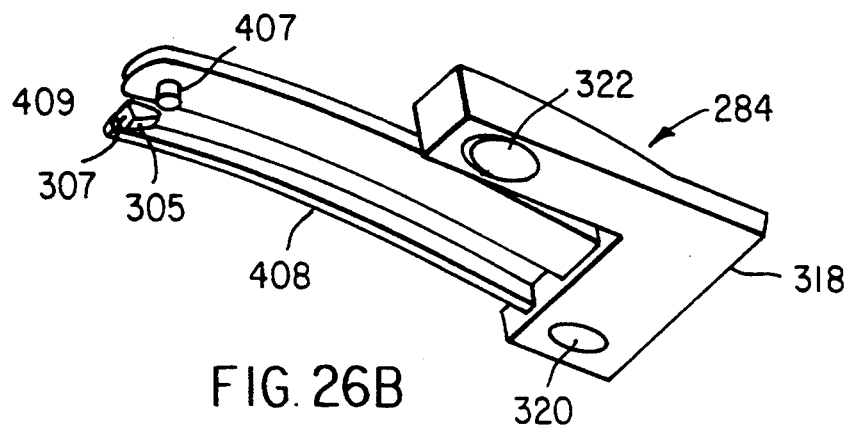
FIG. 26B is an enlarged bottom perspective view of the spring of FIG. 26A.
Figure 27A:
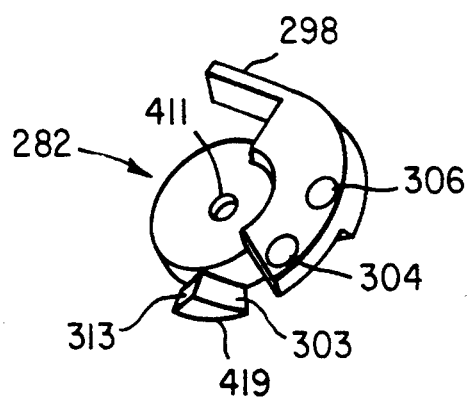
FIG. 27A is an enlarged top perspective view of the film presence indicator of the cassette of FIG. 19.
Figure 27B:
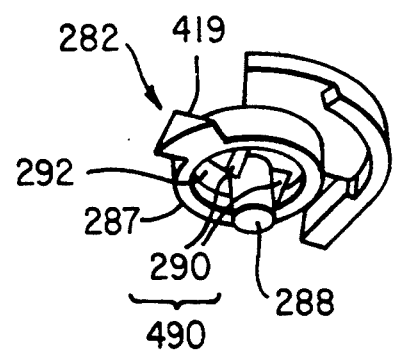
FIG. 27B is an enlarged bottom perspective view of the film presence indicator of the cassette of FIG. 19.

Referring to FIG. 11, there is illustrated the portion of pressure plate 64 which is designed to receive the other side of the film presence indicator 82. In particular, the pressure plate 64 is provided with a pair of pockets 142,144 having a configuration designed to mate and receive the lower cams 90 provided on the lower surface 92 of film presence indicator 82. In particular, the pair of pockets 142,144 are spaced approximately 180° about the rotational axis 145 which is designed to be aligned with the rotational axis 108 of central shaft 88. The pockets 142,144 are spaced a distance R1 from the central axis 145 such that they are substantially the same distance from the axis as the lower cams 90 are from central axis 108. Preferably, the pockets 142,144 extend an angle α1 which is greater than or equal to angle α through which the lower cams 90 extend. This allows the lower cams 90 to be received totally within the pockets 142,144. The size and shape of the pockets 142,144 are such that they closely conform to the outer surface of the cams 90 when the cams 90 are fully seated within the pockets 142,144. This orients the film presence indicator 82 in a third predetermined orientation represented by axis x—x.

Figure 5A:
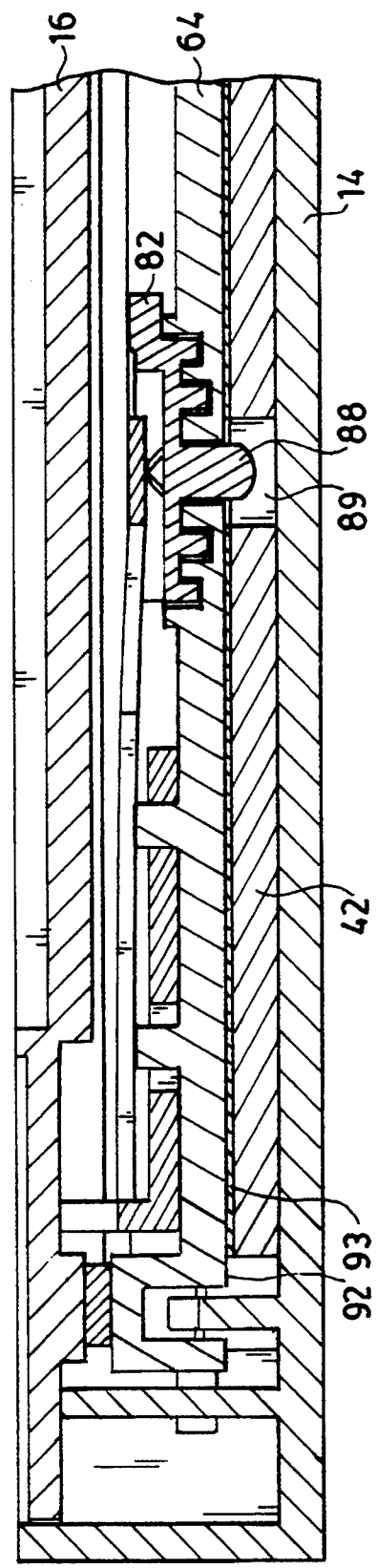
FIG. 5A is a partial cross-sectional view of the cassette of FIG. 1 as taken along line 5—5 illustrating the film presence indicator of the cassette in a first predetermined position.
Figure 9A:
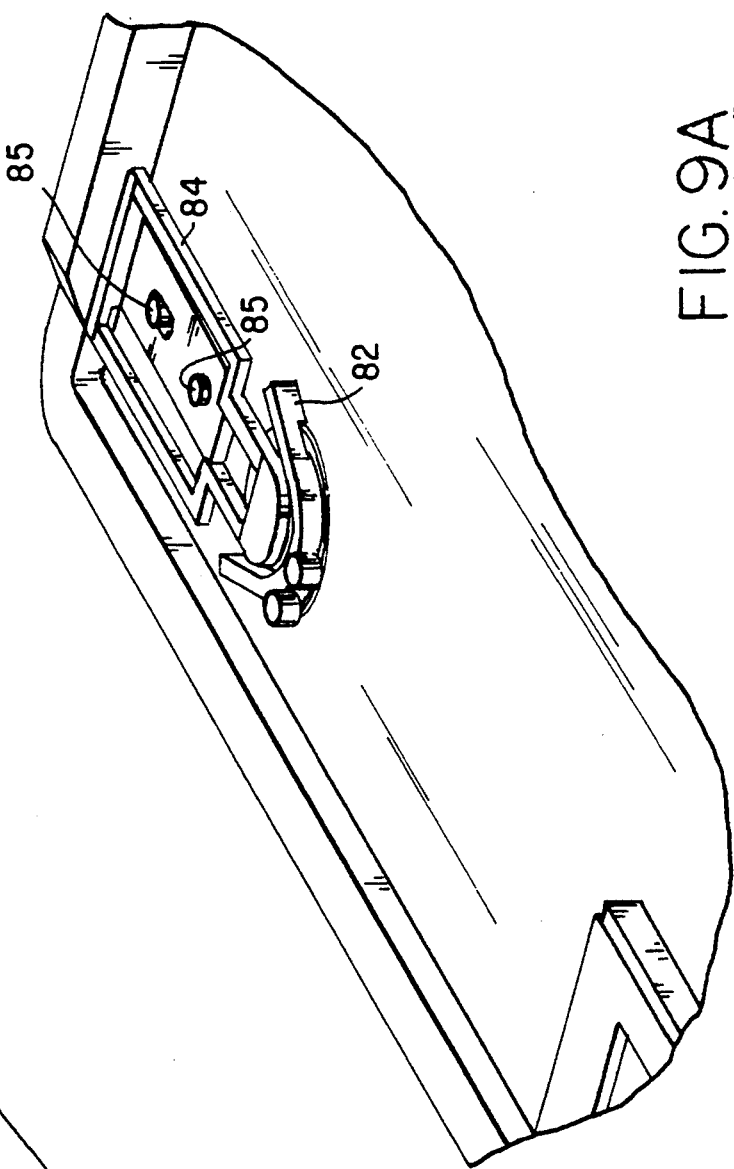
FIG. 9A is an enlarged partial perspective view of the film presence film indicator assembly illustrating the film presence indicator in the position illustrated in FIG. 5A.
Figure 8A:
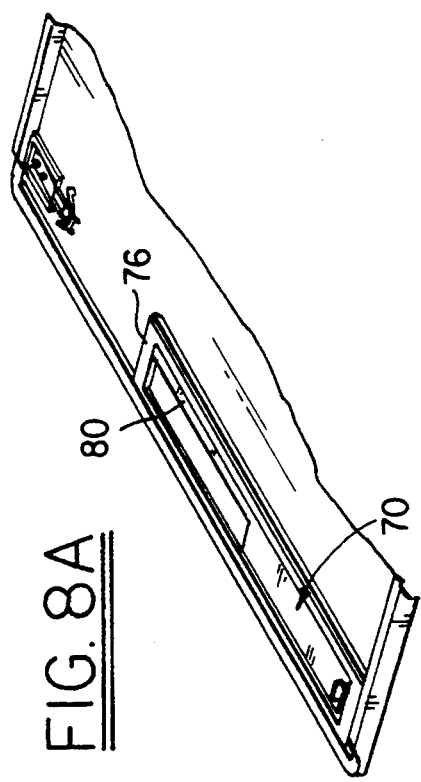
FIG. 8A is a partial perspective view of the pressure plate assembly illustrating the shutter in the closed position.

The film presence indicator 82 is designed such that it will be in one of three positions represented by axes x—x, y—y and z—z. In the initial condition of the film presence indicator 82, when no film is present in the cassette and the cassette is in the closed position as represented by FIG. 5A, the central shaft 88 is biased by the spring member 84 and is received in an opening 89 provided in foam pad 42. Since the lower cams 90 and associated pockets 142,144 are at a greater distance from the central axis 108 and the height of the lower cams 90 is greater than the height of the cams 94, there is provided a mechanical advantage such that the film presence indicator tends to want to go into position as illustrated in FIGS. 5A, 6A and 9A. In this position, the bosses 101,102 do not align with the openings 131,133. Thus, the user would know from this position that no film was present in the cassette.

Figure 5B:
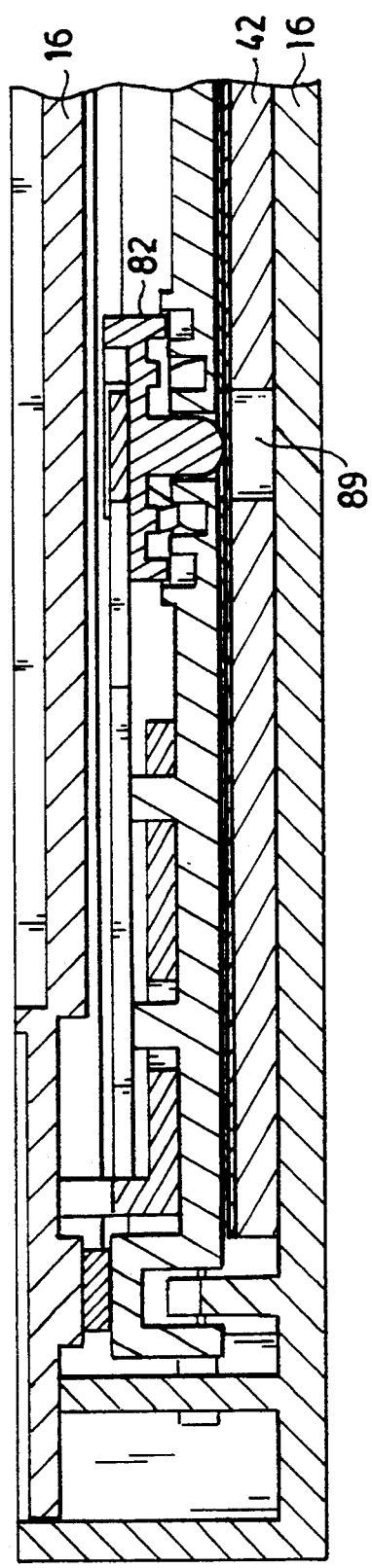
FIG. 5B is a view similar to FIG. 5A illustrating the film presence indicator in a second predetermined position.

Referring to FIGS. 5B, 6B and 9B, this illustrates the position of the film presence indicator 82 within the cassette and the bosses as they would be viewed through the openings 131,133 in cover 16. In this position, film is present in the cassette and extends across opening 89 provided in pad 42 secured to base 14. Thus, the lower cam 90 will be caused to come out of mating engagement with their corresponding pockets 142,144, thus allowing upper cams 94 and pockets 134,135 to move the film presence indicator into the position illustrated in FIGS. 5B, 6B and 9B. In this orientation, boss 102 will be reviewed through opening 133 whereas nothing will be seen through the other opening 131 as illustrated by FIG. 6B. The film presence indicator, in this position, indicates that film is present in the cassette, however, the window shutter has not been activated.

Figure 5C:
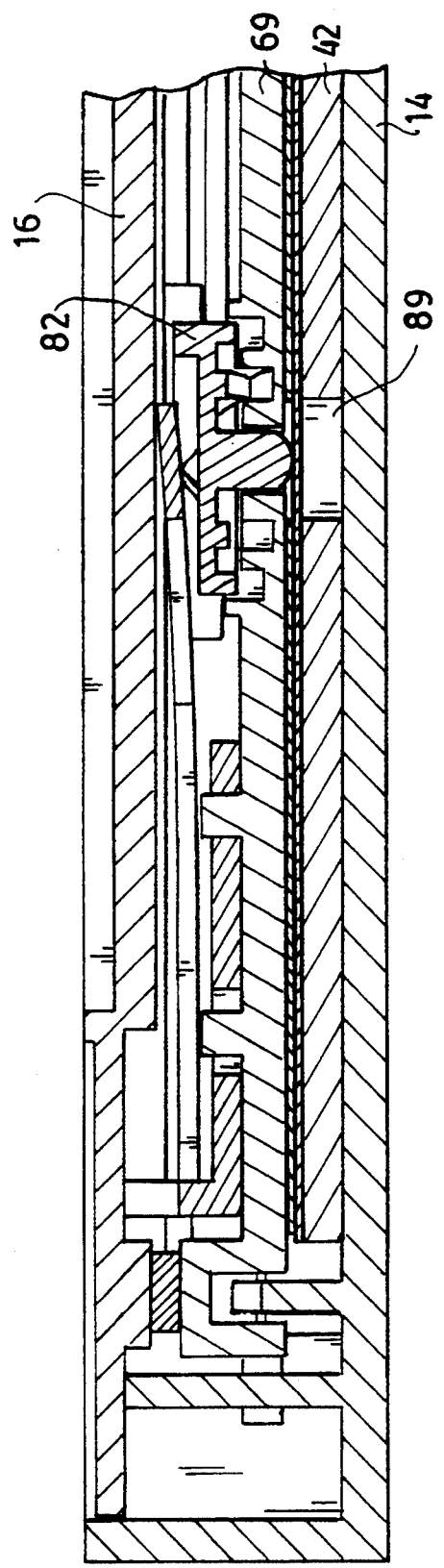
FIG. 5C is a view similar to FIG. 5A illustrating the film presence indicator in a third predetermined position.

Referring to FIGS. 5C, 6C and 9C, there is illustrated the position of the film presence indicator 82 when the shutter 70 has been activated and film is present in the cassette 10. As can be seen by Figure 9C, the shutter 70, in this position, engages one of the wings 98 of the film presence indicator 82. This forces the upper cams 94 to be rotated in the orientation as represented by axis z—z, and engage a second pair of pockets 138,139. Thus, when the shutter 70 is closed, the film presence indicator 82 will remain in this position since the cams 94 will be engaged with the corresponding pockets 138,139. In this position, the surfaces 104,106 of bosses 101,102 can be both viewed through openings 131,133. Thus, there is provided means for determining, without opening of the cassette, whether there is film present in the cassette 10, and whether or not the window shutter 70 has been activated, for example, for the placement of identification on the x-ray film thus avoiding any accidental exposure of the x-ray film.

An alternative embodiment of the invention is shown in FIGS. 19–27B. For clarity, some structural features differing from those in the preceding embodiment, are identified by reference numerals having numeric values equal to 200 plus the numeric value of the reference number previously used for the corresponding feature.

In this embodiment, an indicator assembly includes a spring 284 and an indicator 282. Spring 284 has a pair of resilient arms 401,403 extending outward from a base 318 that is sectored to a pressure plate 264. Each arm 401,403 is capable of resilient movement, toward and away from the pressure plate 264, independent of the other arm, 403,401, respectively. Base 318 includes openings 320,322 for projections 324,326 formed on pressure plate 264.

At the free end of arm 401 is a downwardly extending bearing post 407. Indicator 282 has a bearing recess 411 that receives bearing post 407. In the indicator assembly; bearing post 407, bearing recess 411, and a central shaft 288 are all coaxial and below discussed movements of an indicator 282 comprise rotation about bearing post 407 and vertical movement axial to the axis of central shaft 288.

Indicator 282 has a peripheral wall 287, and a pair of lower cams 290 on a lower surface 292 between central shaft 288 and peripheral wall 287; that function in a similar manner to similarly designated structures in the previously described embodiment. Lower cams 290 together define a cam surface 490. Pressure plate 264 has a socket 413 that includes a recess for peripheral wall 287 and a pair of pockets 342,344. Defined by pockets 342,344 is a pressure plate receiving surface 492 that mates with cam surface 490 when the indicator is in a first or "empty" position. The exact shapes of cam surface 490 and receiving surface 492 can be varied; however, complementary shapes are preferred to minimize inadvertent dislodging of surfaces 490,492.

Socket 413 has an extension 414 extending along a sector of its periphery. Within socket 413 is an opening forming a continuation of opening 89 in foam pad 42. Adjacent to opening 415 are pockets 342,344. Central shaft 288 is disposed within opening 415. The exact configuration and dimensions of central shaft 288, opening 415, peripheral wall 287, and socket 413 are selected so as to minimized binding or wobbling of indicator 282. It is preferred that the configuration and dimensions are also selected so as to provide a light lock preventing ingress of light through opening 415. Socket 413 can be provided with a raised rim 417 to help provide the light lock function.

Referring now particularly to FIGS. 20A, 21A, 23A, and 24A, when film is not present in cassette 210, arm 401 resiliently forces central shaft 288 into opening 89 in foam pad 42 (see FIG. 24A) and cam surface 490 into engagement with receiving surface 492 (not visible in figures). Referring now particularly to FIGS. 20B, 21B, 23B, and 24B, when film is loaded into cassette 210, central shaft 288 is displaced from opening 89 in foam pad 42 and cam surface 490 is displaced from receiving surface 492. Arm 401 of spring 284 is deflected outward from pressure plate 264, but bearing post 407 remains in recess 411 and arm 401 continues to bias indicator 282 toward base 14.

Arm 403 has a main portion 408 and a downwardly directed wedge portion or cam 409 at the free end of arm 403. It is currently preferred that cam 409 be laterally offset from the free end of arm 403, such that vertical thickness of arm 403 is minimized. Cam 409 includes first and second spring engagement surfaces 305,307.

Indicator 282 has an upwardly directed peripheral cam 419 that is radially aligned with spring cam 409. Extension 414 of socket 413 accommodates indicator cam 419 and includes stop-walls or stops 416,418 to limit rotation of cam 419 and indicator 282. Indicator cam 419 has first and second indicator engagement surfaces 303,313.

Spring cam 409 and indicator cam 419 are forced into engagement by spring arm 403, when film is present in cassette 210. Installing film moves indicator 282 from a first predetermined or "empty" position (FIGS. 20A, 21A, 23A, and 24A) to a second predetermined or "loaded" position (FIGS. 20B, 21B, 23B, and 24B). Indicator 282 rotates, under the resilient urging of spring arm 403, until cam 419 contacts stop wall 416. In this position, a first spring engagement surface 305 of cam 409 engages a first indicator engagement surface 303 of cam 419. Spring arm 403 then holds indicator 282 in loaded position until shutter 70 is opened during use of the cassette 210. Opening shutter 70 forces actuating member 80 of shutter 70 against a wing 298 of indicator 282, overcoming the biasing of spring arm 403 and rotating indicator 282 until cam 419 contacts stop wall 418. (See FIG. 23C) Pressure plate 264 can include fences 421 to guide actuator member into contact with wing 298.

After shutter 70 is reclosed, indicator 282 remains in exposed position, with cam 419 in contact with stop wall 418 and spring arm 403 resiliently biasing engagement of a second spring engagement surface 307 of cam 409 and a second indicator engagement surface 313 of cam 419. (See FIG. 23D) This is a third predetermined or "exposed" position of indicator 282. In currently preferred embodiments of the invention, there is very little or no movement of indicator 282 from the position it assumes when shutter 70 is opened to the position indicator 282 assumes when shutter 70 is then closed and both positions are identified herein as the "exposed" position.

Each position of indicator 282 is indicated at the exterior of cassette 210 by means of a register that makes ascertainable the position of indicator. In the embodiment illustrated, register has one or more openings or indicator windows 331,333 through which bosses 304,306 on indicator 282 are visible. The angular displacement between the loaded and exposed positions of indicator 282 is a function of the shape of cams 409,419 and can be varied within limits defined by a desired geometry of bosses 304,306 and openings 331,333. For example, one of cams 409,419 can have the shape of a pin and the other 419 or 409 can have the shape of a broad wedge. It is currently preferred, however, that both cams 409,419 be wedge shaped, upwardly and downwardly directed, respectively, with cam 419 more than twice as big as cam 409. It is further currently preferred that cams 409,419 deter movement of indicator 282 out of exposed position, to a greater degree than cams 409,419 deter movement of indicator 282 from loaded position to exposed position. This is provided by the presence of a greater slope on both second engagement surfaces 313,307; than is provided on both first engagement surfaces 303,305.

In the preferred embodiment illustrated, two bosses are provided which are viewed through two openings in the cover to provide an indication if film is present and/or if the shutter has been activated. This can also be accomplished by use of one boss and two openings in the cover and still provide the two indicating modes. Alternatively, one opening may be provided in the cover and two bosses of two different colors may be provided on the film presence indicator.

The present invention provides a cassette having a film presence indicator which will indicate the presence of film in the cassette regardless of the cassette orientation, and will, in addition, indicate whether a patient identification window of the cassette has been actuated. Further, when a cassette is open for removal of the film, the film presence indicator will push the film away from the upper screen assuring that the film is in the proper location for extraction by automatic cassette loaders.

It is to be understood that various other changes and modifications may be made without departing from the scope of the present invention. The present invention is defined by the following claims:

I claim:

1. An x-ray film cassette comprising:
a base;
a cover adapted to close upon said base, said cover having an identification window;
a pressure plate secured within the cassette, said pressure plate and said base forming a space for receiving a sheet of x-ray film, said pressure plate having an identification window which is in substantial alignment with said identification window of said cover;
a window shutter for covering said identification window of said cover and/or said pressure plate, said window shutter when in a first position, providing a light-tight seal against the cassette surrounding the windows and when in a second position allowing information to be provided to an x-ray film contained within the cassette; and
an indicator assembly disposed within said cassette, said indicator assembly having an indicator member at least partially visible through at least one opening provided in said cover, said indicator member being disposed in first position when said cassette is empty of film, in second position when film is present and said window shutter is unopened, and in a third position when said film is present and said window shutter has been opened.

2. An x-ray film cassette comprising:
a base;
a cover adapted to close upon said base, said cover having an identification window;
a pressure plate secured within the cassette, said pressure plate and said base forming a space for receiving a sheet of x-ray film, said pressure plate having identification window which is in substantial alignment with said identification window of said cover;
a light-tight slideable window shutter, for covering of said identification window of said cover and/or said pressure plate, said slideable window shutter, when in a first position, provides a light-tight seal against the cassette surrounding the windows and when in a second position allows information to be provided to an x-ray film contained within the cassette; and
an indicator assembly secured to said pressure plate and at least partially visible through at least one opening provided in said cover for indicating when film is present within the cassette and for indicating when the window shutter has been opened, said indicator assembly including a rotatable indicating member rotatable about a central axis and having an upper surface and a lower surface, and a spring secured to said pressure plate and engaging said rotatable indicating member so as to bias said indicating member toward said pressure plate, said upper surface having at least one upper cam and said lower surface having at least one lower cam.

3. An x-ray film cassette according to claim 2 wherein said spring is provided with a first cam pocket for receiving said at least one upper cam such that said rotatable indicating member will be biased in a first predetermined orientation when said cam engages said cam pocket.

4. An x-ray film cassette according to claim 3 wherein said spring is provided with a second cam pocket for receiving said at least one upper cam such that said rotatable indicating member will be biased in a second predetermined orientation when said cam engages said cam pocket.

5. An x-ray film cassette according to claim 2 wherein said pressure plate is provided with a third cam pocket for receiving said at least one lower cam such that the rotatable indicating member will be biased in a third predetermined orientation when said at least one lower cam engages said third cam pocket.

6. An x-ray film cassette according to claim 2 wherein said rotatable indicating member includes a shaft designed to pass through an opening provided in said pressure plate, said shaft designed to engage the surface of an x-ray film sheet placed between said pressure plate and said base.

7. An x-ray film cassette according to claim 2 wherein said rotatable indicating member includes first and second indicating surface for indicating the presence of film and whether the window shutter has been activated, said first and second indicating surface being capable of being viewed through a pair of openings provided in said cover.

8. An x-ray film cassette according to claim 3 such that said at least one upper cam, said at least one lower cam and said rotatable indicating member having a configuration such that when said shaft extends through the opening in said pressure plate and no film is present in the cassette, said at least one lower cam and associated pocket will determine the rotational orientation of the rotatable film indicator member and when film is present in said cassette the upper cam and associated pockets will determine the rotational orientation of said rotatable indicating member.

9. An x-ray film cassette according to claim 7 wherein said at least one lower cam is positioned on said rotatable indicating member at a radius greater than the radius at which the at least one upper cam is located on rotatable indicating member.

10. An x-ray film cassette according to claim 7 wherein said at least one lower cam has a slope of greater than the slope of the at least one upper cam.

11. An x-ray film cassette according to claim 2 wherein said window shutter has a tongue designed to engage said rotatable indicating member so as to rotate said indicating member to said second predetermined orientation.

12. An x-ray film cassette according to claim 6 wherein said shaft is centrally located at the axis of rotation of said indicating member.

13. An x-ray film cassette according to claim 2 wherein said spring comprises a base secured to said pressure plate and at least one spring arm extending from said base which terminates in a spring head.

14. An x-ray film cassette according to claim 3 wherein said spring comprises a base secured to said pressure plate and at least one spring arm extending from said base which terminates in a spring head, said first and second cam pockets being located in said spring head.

15. An x-ray film cassette according to claim 2 wherein said indicator assembly includes a rotatable indicating member rotatable about a central axis and having an upper surface and a lower surface, and a spring secured to said pressure plate and engaging said rotatable indicating member so as to bias said indicating member toward said pressure plate, said upper surface having a pair of upper cams and said lower surface having a pair of lower cams.

16. An x-ray film cassette according to claim 15 wherein said spring is provided with first and second pairs of cam pockets for receiving said pair of upper cams such that said rotatable indicating member will be biased in a first or second predetermined orientation when said upper cams engage said first or second associated pair of cam pockets.

17. An x-ray film cassette according to claim 15 wherein said pressure plate is provided with a third pair of cam pockets for receiving said pair of associated lower cams such that the rotatable indicating member will be biased in a third predetermined orientation when said pair of lower cams engages said third pair of cam pockets.

18. An x-ray film cassette comprising:
a base;
a cover adapted to close upon said base, said cover having an identification window;
a pressure plate secured within the cassette, said pressure plate and said base forming a space for receiving a sheet of x-ray film, said pressure plate having an identification window which is in substantial alignment with said identification window of said cover;
a window shutter for covering of said identification window of said cover and/or said pressure plate, said window shutter when in a first position, provides a light-tight seal against the cassette surrounding the windows and when in second position allows information to be provided to an x-ray film contained within cassette; and
an indicator assembly disposed within the cassette and being at least partially visible through at least one opening provided in said cover for indicating when film is present within the cassette and for indicating when the window shutter has been opened, said indicator assembly including a rotatable indicating member rotatable about a central axis and having an upper surface and a lower surface, and a spring secured to said pressure plate and engaging said rotatable indicating member so as to bias said indicating member toward said pressure plate, said upper surface having a pair of upper cams and said lower surface having a pair of lower cams.

19. An x-ray film cassette according to claim 18 wherein said spring is provided with first and second pairs of cam pockets for receiving said pair of upper cams such that said rotatable indicating member will be biased in a first or second predetermined orientation when said upper cams engage said first or second associated pair of cam pockets.

20. An x-ray film cassette according to claim 18 wherein said pressure plate is provided with a third pair of cam pockets for receiving said pair of associated lower cams such that the rotatable indicating member will be biased in a third predetermined orientation when said pair of lower cams engages said third pair of cam pockets.

21. An x-ray film cassette comprising:
a base;
a cover adapted to close upon said base, said cover having an identification window;
a pressure plate secured within the cassette, said pressure plate and said base forming a space for receiving a sheet of x-ray film, said pressure plate having an identification window which is in substantial alignment with said identification window of said cover;
a light-tight slideable window shutter for covering said identification window of said cover and/or said pressure plate, said slideable window shutter, when in a first position, providing a light-tight seal against the cassette surrounding the windows and when in a second position allowing information to be provided to an x-ray film contained within the cassette; and
an indicator assembly secured to said pressure plate, said indicator assembly having an indicator member at least partially visible through at least one opening provided in said cover, said indicator member being disposed in a first position when said cassette is empty of film, in a second position when film is present and said window shutter is unopened, and in a third position when said film is present and said window shutter has been opened.

22. An x-ray film cassette according to claim 21 wherein said indicator assembly includes an indicator and a spring, said indicator defining an axis extending upward from said pressure plate, said indicator being movable upwardly and downwardly along said axis and rotatably about said axis, said spring resiliently opposing upward and rotational movement of said indicator, said indicator having a downwardly directed cam surface and upwardly directed first and second indicator engagement surfaces, said cam surface engaging said pressure plate when said indicator is in said first position, said spring having downwardly directed first and second spring engagement surfaces, said first engagement surfaces of said indicator and said spring being engaged when said indicator is in said second position, said second engagement surfaces of said indicator and said spring being engaged when said indicator is in said third position.

23. An x-ray film cassette according to claim 22 wherein said spring has first and second arms, said first arm having a free end bearing on said indicator adjacent said axis, said second arm having a free end including said spring engagement surfaces.

24. An x-ray film cassette according to claim 23 wherein said second arm has a main portion and a wedge portion, said wedge portion being laterally and vertically offset from said main portion, said wedge portion including said spring engagement surfaces.

25. An x-ray film cassette according to claim 22 wherein said spring has first and second arms, said first arm applying a resilient force to said indicator substantially along said axis, said second arm applying a resilient force to said indicator in radially spaced relation to said axis, whereby said first arm predominantly opposes movement of said indicator from said first position to said second position and said second arm predominantly opposes rotational movement of said indicator.

26. An x-ray film cassette according to claim 21 wherein said indicator assembly includes an indicating member rotatable about a central axis and having an upper surface and a lower surface, and a spring secured to said pressure plate and engaging said rotatable indicating member so as to bias said indicating member toward said pressure plate, said indicating member having a peripheral cam, said lower surface having at least one lower cam.

27. An x-ray film cassette comprising:
a base;
a cover adapted to close upon said base, said cover having an identification window and a register;
a pressure plate secured within said cassette, said pressure plate and said base forming a space for receiving a sheet of x-ray film, said pressure plate having an identification window in substantial alignment with said identification window of said cover;
a light-tight slideable window shutter moveable between a first position and a second position, said window shutter, in said first position, sealing against the passage of light through said identification windows to said x-ray film, said window shutter in said second position, being spaced apart from said windows to allow passage of light through said windows to said x-ray film;
an indicator disposed on said pressure plate, said indicator being moveable between first, second, and third positions, said indicator being disposed in said first position when said cassette is empty of x-ray film, in said second position when x-ray film is present and said window shutter is unopened, and in said third position when said x-ray film is present and said window shutter has been opened, said indicator positions being ascertainable at said register; and
a spring resiliently opposing said movement of said indicator between said positions.

28. The x-ray film cassette of claim 27 wherein said spring has first and second arms, said first arm resiliently biasing said indicator toward said pressure plate, said second arm resiliently opposing movement of said indicator when said indicator is in said second position, said second arm resiliently opposing movement of said indicator when said indicator is in said third position.

29. An x-ray film cassette comprising:
a base;
a cover adapted to close upon said base;
a pressure plate disposed between said cover and said base, said pressure plate and said base defining a film space for receiving a sheet of x-ray film, said pressure plate having a hole communicating with said film space;
an indicator assembly mounted to said pressure plate, said indicator assembly including an indicator and a spring,
said indicator having a main portion and a shaft extending downward from said main portion, said main portion having a downwardly directed cam surface and at least one upwardly directed engagement surface,
said spring resiliently biasing said indicator toward said pressure plate, said spring having at least one downwardly directed engagement surface,
said indicator being movable between
(a) a primary position wherein said shaft extends through said hole into said film space and said pressure plate engages said cam surface constraining rotation of said indicator, and
(b) at least one secondary position wherein said shaft is displaced from said film space, said cam surface is disposed in spaced relation to said pressure plate, and one said spring engagement surface engages one said indicator engagement surface constraining rotation of said indicator,
said indicator in said secondary position being rotated relative to said primary position.

30. An x-ray film cassette according to claim 29 wherein said spring resiliently opposes movement of said indicator between said positions.

31. An x-ray film cassette according to claim 30 wherein said pressure plate has at least one stop, and said spring resiliently urges said indicator against one said stop when said indicator is in one of said secondary positions.

32. An x-ray film cassette according to claim 30 wherein one of said spring and said indicator has first and second engagement surfaces, and said indicator is movable among a primary position and two secondary positions.

33. An x-ray film cassette according to claim 32 wherein said cover and said pressure plate include vertically aligned identification windows and said cassette further comprises a light-tight slideable window shutter moveable between a first position and a second position, said window shutter, in said first position, sealing against the passage of light through said identification windows to said x-ray film, said window shutter in said second position, being spaced apart from said identification windows to allow passage of light through said windows to said x-ray film, said movement of said shutter driving said indicator from one of said secondary positions to the other said secondary position.

34. A x-ray film cassette according to claim 29 wherein said indicator has first and second upwardly directed engagement surfaces, and said indicator is movable among a primary position and two secondary positions.

35. An x-ray film cassette comprising:

a base;

a cover adapted to close upon said base;

a pressure plate disposed between said cover and said base, said pressure plate and said base defining a film space for receiving a sheet of x-ray film, said pressure plate having a hole communicating with said film space;

an indicator assembly mounted to said pressure plate, said indicator assembly including an indicator and a spring, said indicator having a main portion and a shaft extending downward from said main portion, said shaft defining an axis of rotation, said main portion having a downwardly directed cam surface and at least one upwardly directed engagement surface, said spring resiliently biasing said indicator toward said pressure plate, said spring having at least one downwardly directed engagement surface, said indicator being movable between (a) a primary position wherein said shaft extends through said hole into said film space, said cam surface engages said pressure plate in rotationally constrained relation, and said engagement surfaces are disposed in spaced relation, and (b) at least one secondary position wherein said shaft is displaced from said film space, said cam surface is disposed in spaced relation to said pressure plate, and one said indicator engagement surface engages one said spring engagement surface in rotationally constrained relation, said secondary position being angularly displaced about said axis from said primary position.

36. An x-ray film cassette according to claim 35 wherein said spring has first and second arms, said first arm applying a resilient force to said indicator substantially along said axis, said second arm applying a resilient force to said indicator in radially spaced relation to said axis, whereby said first arm predominantly opposes axial movement of said indicator and said second arm predominantly opposes rotational movement of said indicator.

* * * * *